US011731056B2

(12) United States Patent
Hirsch

(10) Patent No.: US 11,731,056 B2
(45) Date of Patent: Aug. 22, 2023

(54) SYSTEM, METHOD, AND APPARATUS FOR IMPROVED BRACKET CONTESTS

(71) Applicant: Platform Gaming Technologies, Inc., Indianapolis, IN (US)

(72) Inventor: David Brian Hirsch, Indianapolis, IN (US)

(73) Assignee: Platform Gaming Technologies, Inc, Indianapolis, IN (US)

( * ) Notice: Subject to any disclaimer, the term of this patent is extended or adjusted under 35 U.S.C. 154(b) by 0 days.

(21) Appl. No.: 17/542,565

(22) Filed: Dec. 6, 2021

(65) Prior Publication Data
US 2022/0203246 A1 Jun. 30, 2022

Related U.S. Application Data

(60) Provisional application No. 63/131,224, filed on Dec. 28, 2020.

(51) Int. Cl.
A63F 13/35 (2014.01)
A63F 13/798 (2014.01)

(52) U.S. Cl.
CPC ............ A63F 13/798 (2014.09); A63F 13/35 (2014.09)

(58) Field of Classification Search
CPC ............................... A63F 13/798; A63F 13/35
See application file for complete search history.

(56) References Cited

U.S. PATENT DOCUMENTS

| | | | | |
|---|---|---|---|---|
| 7,076,434 B1* | 7/2006 | Newnam | ............ | G06Q 30/0213 705/14.15 |
| 2009/0170584 A1* | 7/2009 | Tan | ............ | G07F 17/32 463/16 |
| 2009/0186679 A1* | 7/2009 | Irvine | ............ | A63F 13/65 463/16 |
| 2009/0270155 A1* | 10/2009 | Glass | ............ | G07F 17/32 463/43 |
| 2010/0252998 A1* | 10/2010 | Guidroz | ............ | G07F 17/3288 273/292 |
| 2012/0244947 A1* | 9/2012 | Ehrlich | ............ | G06Q 10/04 463/43 |
| 2014/0309023 A1* | 10/2014 | Suyat | ............ | G07F 17/3276 463/29 |
| 2015/0080130 A1* | 3/2015 | Tanibuchi | ............ | A63F 13/65 463/31 |

(Continued)

Primary Examiner — David L Lewis
Assistant Examiner — Shuana-Kay Hall
(74) Attorney, Agent, or Firm — Larson & Larson, P.A.; Frank Liebenow

(57) ABSTRACT

A bracket contest system has an entrant device connected to a server having a set of matches in a single elimination bracket tournament in memory. Each match is between two participants in the tournament in which one half of the participants are eliminated in each round. The entrant device receives predictions before a start of a first match. Each prediction includes a pre-set number of predicted winners of each match starting with a winner of a final match. The predictions are entered sequentially based on a predicted final rank of the participants, from first place to nth place. After each selection, a next selection is limited to participants from a predetermined valid position in the tournament. After receiving results of the set of matches, a score of the predictions is made based upon the results, and if the score exceeds a threshold, the predictions are declared a winning entry.

20 Claims, 17 Drawing Sheets

(56) References Cited

U.S. PATENT DOCUMENTS

| | | | | |
|---|---|---|---|---|
| 2015/0258443 A1* | 9/2015 | McAuley | ............... | A63F 13/46 |
| | | | | 463/31 |
| 2015/0298000 A1* | 10/2015 | Hirsch | ................... | A63F 13/00 |
| | | | | 463/42 |
| 2016/0027259 A1* | 1/2016 | Jeffries | .............. | G07F 17/3276 |
| | | | | 463/40 |
| 2016/0217653 A1* | 7/2016 | Beyer | ................ | G07F 17/3227 |
| 2017/0084108 A1* | 3/2017 | Smith | ................ | G07F 17/3237 |
| 2017/0259179 A1* | 9/2017 | Anderson | ............ | A63F 13/798 |
| 2018/0126269 A1* | 5/2018 | Lourenco | ............. | A63F 13/828 |

\* cited by examiner

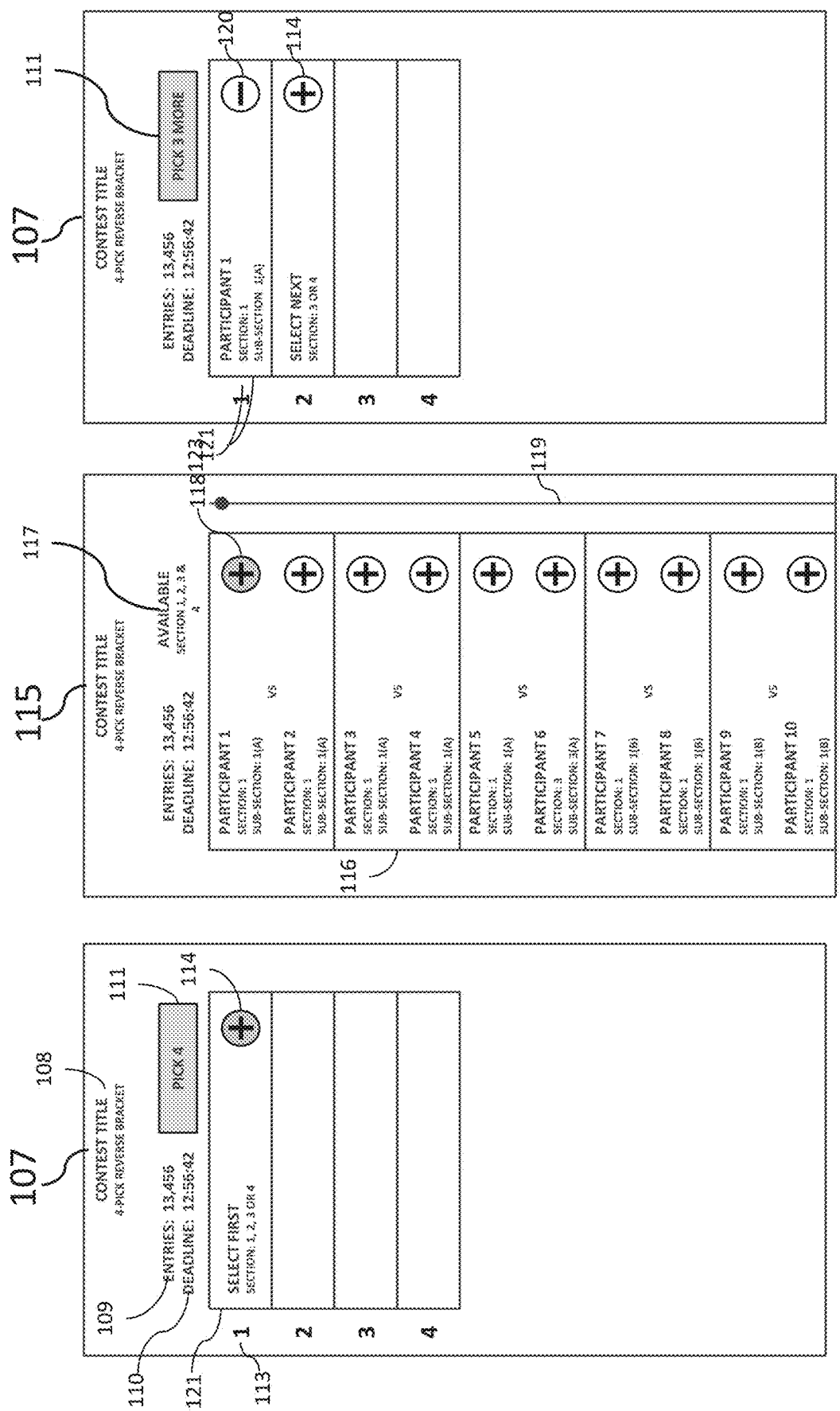

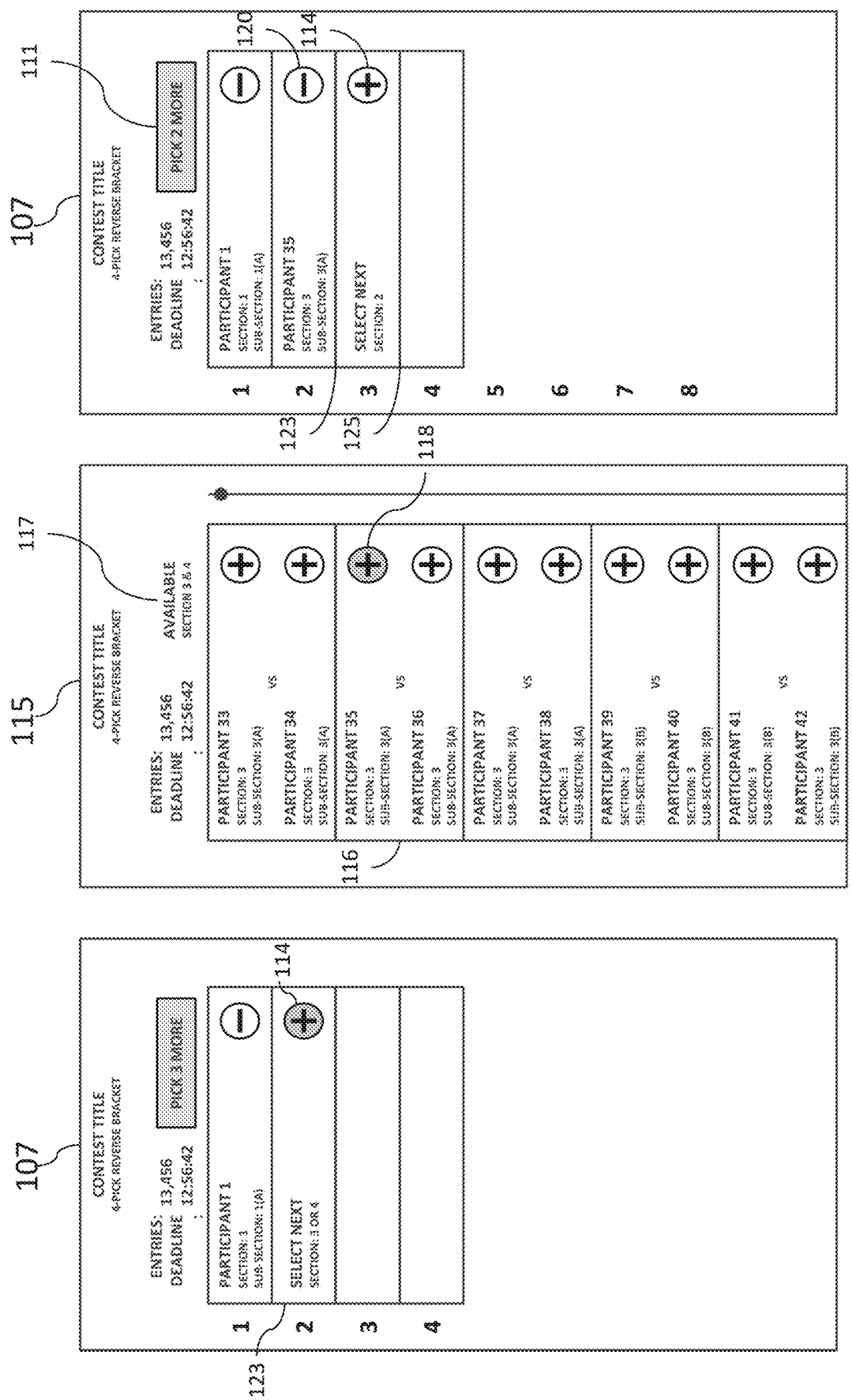

CONTEST TITLE
4-PICK REVERSE BRACKET

| FINAL SCORE | FINAL RANK | PRIZE |
|---|---|---|
| 7000 | 1234 / 2500 | COUPON |

223

| PLACE | SCORE |
|---|---|
| 1ST | 3200 |
| 2ND | 1600 |
| 3RD | 850 |
| 4TH | 800 |
| 5TH TO 8TH | 400 |
| 9TH TO 16TH | 200 |
| 17TH TO 32ND | 100 |
| 33RD TO 64TH | 0 |

225

DOUBLE POINTS FOR EXACT PLACE

| SCORING | MY PICKS | LEADERS |
|---|---|---|

CONTEST TITLE
4-PICK REVERSE BRACKET

| FINAL SCORE | FINAL RANK | PRIZE |
|---|---|---|
| 7000 | 1234 / 2500 | COUPON |

| | | PLACE | PTS | BONUS |
|---|---|---|---|---|
| 1 | PARTICIPANT 1<br>SECTION: 1<br>SUB-SECTION: 1(A) | 12 | 200 | -- |
| 2 | PARTICIPANT 35<br>SECTION: 3<br>SUB-SECTION: 3(A) | 2 | 1600 | 1600 |
| 3 | PARTICIPANT 25<br>SECTION: 2<br>SUB-SECTION: 2(B) | 8 | 400 | -- |
| 4 | PARTICIPANT 49<br>SECTION: 4<br>SUB-SECTION: 4(A) | 1 | 3200 | -- |
| | TOTAL | | 5400 | 1600 |

231  232

| SCORING | MY PICKS | LEADERS |
|---|---|---|

CONTEST TITLE
4-PICK REVERSE BRACKET

| FINAL SCORE | FINAL RANK | PRIZE |
|---|---|---|
| 7000 | 1234 / 2500 | COUPON |

234  236

| | | | |
|---|---|---|---|
| 1 | ENTRY 2347<br>ENTRANT NAME<br>ENTRANT LOCATION | | TOTAL 10400 |
| 2 | ENTRY 176<br>ENTRANT NAME<br>ENTRANT LOCATION | | TOTAL 10200 |
| 3 | ENTRY 84<br>ENTRANT NAME<br>ENTRANT LOCATION | | TOTAL 9800 |
| 4 | ENTRY 1098<br>ENTRANT NAME<br>ENTRANT LOCATION | | TOTAL 9600 |
| 5 | ENTRY 760<br>ENTRANT NAME<br>ENTRANT LOCATION | | TOTAL 9400 |
| 6 | ENTRY 451<br>ENTRANT NAME<br>ENTRANT LOCATION | | TOTAL 8900 |
| 7 | ENTRY 908<br>ENTRANT NAME<br>ENTRANT LOCATION | | TOTAL 8800 |
| 8 | ENTRY 386<br>ENTRANT NAME<br>ENTRANT LOCATION | | TOTAL 8850 |

235

| SCORING | MY PICKS | LEADERS |
|---|---|---|

228

| n | Standard Bracket | Number of Decisions required to fill out a Bracket | | |
|---|---|---|---|---|
| | | Reverse Bracket | Reduction | Reduction % |
| 8 | 7 | 4 | 3 | 43.9% |
| 16 | 15 | 8 | 7 | 46.7% |
| 32 | 31 | 16 | 15 | 48.4% |
| 64 | 63 | 32 | 31 | 49.2% |
| 128 | 127 | 64 | 63 | 49.6% |
| 256 | 255 | 128 | 127 | 49.8% |

FIG. 9

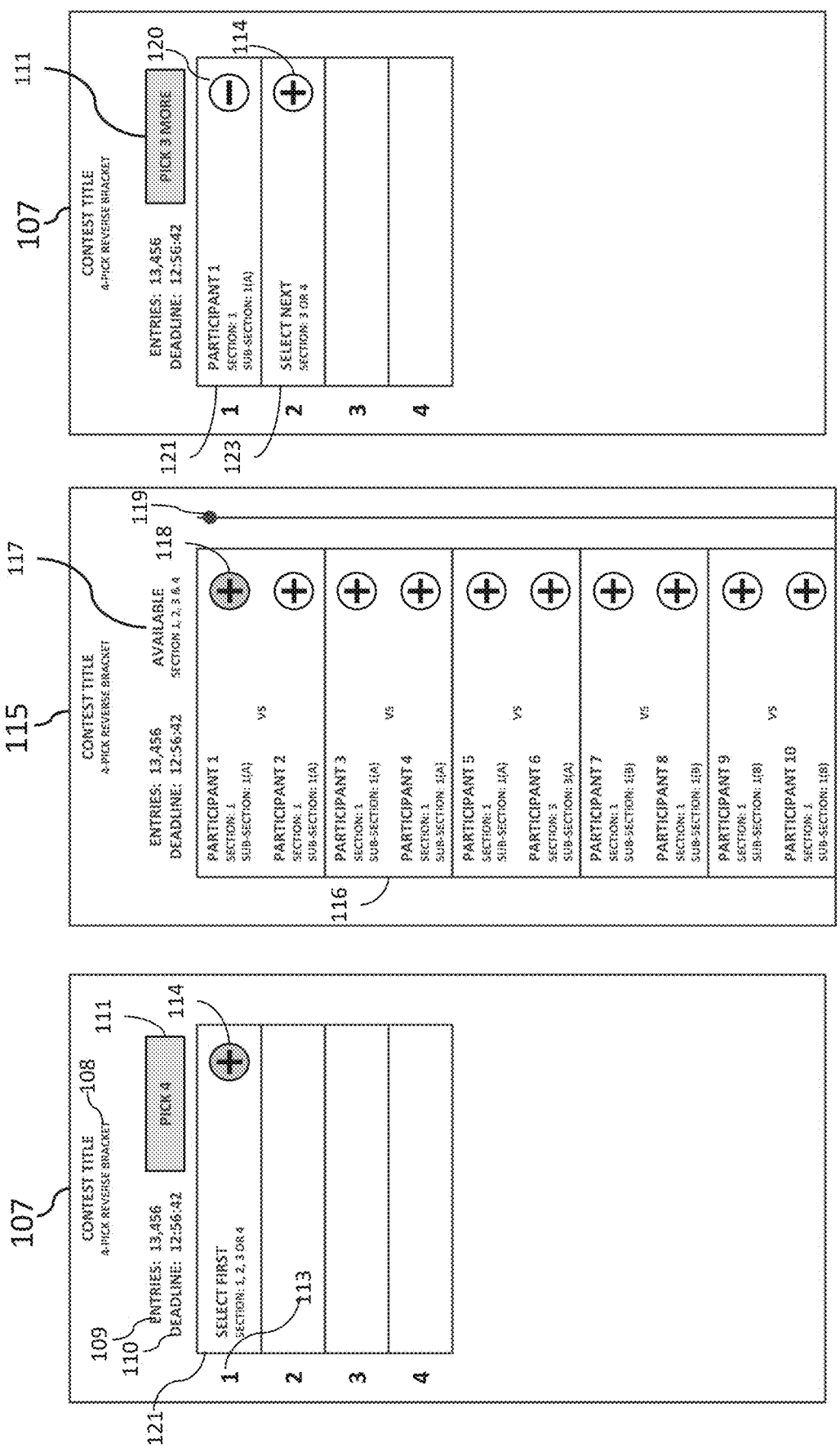

SYSTEM, METHOD, AND APPARATUS FOR IMPROVED BRACKET CONTESTS

FIELD

This invention relates to the field of entertainment and more particularly to an alternative method for administering a game or contest based on the results of an underlying single elimination bracket tournament.

BACKGROUND

A bracket is a structured tree diagram that graphically represents the series of matches to be played during an elimination tournament. The term bracket is often interchangeable with the term "draw." Although draw implies an element of randomness or chance, in today's language, the two terms are essentially interchangeable and for purposes of this application, their meaning is the same.

There are different types of bracket tournaments. The most common is a single elimination bracket tournament where a participant (teams, individual players, etc.) is eliminated from the tournament upon a single loss. Other bracket tournaments include double and even triple elimination. In double and triple elimination tournaments, participants re-enter the draw after a loss until a maximum number of losses are incurred.

Many bracket tournaments employ a process called "seeding" where some or all of the participants are ranked before the start of the tournament and then placed into the draw strategically to provide balance. An example of a tournament where all of the participants are seeded is the NCAA Men's Basketball Tournament where all teams are assigned a seed or ranking from one to 16 in their respective geographical Regions. Professional tennis takes a slightly different approach and only seeds a portion of the players. For example, in Wimbledon, 32 of the 128 participants in the men's and women's singles tournament are seeded and placed in strategic locations of the draw.

Single elimination bracket tournaments are almost always designed to accommodate a number of participants that will ultimately lead to a single championship match (i.e., 4, 8, 16, 32, 64, 128 and so on where the number is a power of 2). This is because each successive round of play eliminates one-half of the remaining participants until a final match is played and one participant is crowned the champion. However, in some cases, there may be a qualifying round where a discrete number of participants play in preliminary matches to gain entry into the first round of the tournament. Additionally, in some cases, highly seeded teams may earn an automatic "bye" into a subsequent round. However, when this occurs, the draw always normalizes such that it will terminate with a final match. For example, in the NFL Playoffs, the top two teams from each of the American and National Conferences earn a bye in the first round of the tournament, the "Wild Card" round. The winners of the Wild Card games then become one of eight teams in the Divisional Championship.

Brackets for a single elimination tournament are typically subdivided divided into separate, but equal halves, sections, sub-sections, sub-sub sections and so forth by dividing the field of participants by two in successive iterations. There are two halves that stem from the two participants in the final game; four sections that stem from the participants in the semi-finals, eight sub-sections that stem from the participants in the quarterfinals, 16 sub-sub-sections that stem from the participants in the Round of 16 and so on and so forth until the number reaches the total number of participants in the first round of play (i.e., six rounds in a 64-participant tournament).

Another feature of a single elimination tournament is that a final ranking or "place" of all the participants at the end of the tournament is typically not produced, with the exception of the winner and runner-up who are ranked $1^{st}$ and $2^{nd}$. For example, the two losers of the semi-finals are often not designated with the final rank of $3^{rd}$ and $4^{th}$ respectively, unless they play a consolation match to determine the $3^{rd}$ and $4^{th}$ place rank.

The most popular single elimination bracket tournament in the United States is the NCAA Men's Basketball Tournament (the "NCAA Tournament"), which is held from mid-March to early April each year. In the NCAA Tournament, a committee is formed to determine the basketball teams that qualify for the tournament. At the initial stage, each member casts a ballot that includes 36 basketball teams the member believes deserve to make the tournament and an unlimited of additional basketball teams that merit consideration. Based on the results and through a deliberation process, the basketball teams to be admitted are selected for an at-large field. During the next stage, the seeding process is commenced. The committee votes on basketball teams four-at-a-time and ultimately ranks all of the basketball teams in the field from one to 68. The final step in the process is bracketing. In this stage, the committee assigns the top 60 ranked basketball teams to one of four geographical Regions: East, West, South and Midwest. Additionally, eight basketball teams play in four single elimination games (the "First Four") with the winners earning one of the four remaining spots in the first round of the tournament. Each region consists of 16 basketball teams that are then seeded from 1 to 16. The tournament is played in a series of six rounds; (1) the first round, (2) second round, (3) the Sweet 16, (4) the Elite 8, which produces the champion of each Region, (5) the Final 4, which produces the winner of the East and West Region champions and the winner of the South and Midwest Region champions, and (6) the Finals.

An estimated 60 million Americans (entrants) participate in "March Madness" contests by filling out brackets across the country. In a typical NCAA Tournament bracket contest, entrants are required to predict the outcome of all 63 games (or 67 games if predictions for the First Four games are also required). Entries (predicted outcomes of the entrants) must be submitted by the entrants before the start of the first game. The games are played and entries are typically awarded points for each correct prediction, typically based on the round of the game correctly predicted. For example, a contest operator might award one point for a correct prediction in the first round, two points for a correct prediction in the second round, four points for a correct prediction in the third round (the "Sweet 16"), eight points for a correct selection in the fourth round (the "Elite 8"), 16 points for a correct selection in the fifth round (the semi-finals, or "Final 4") and 32 points for a correct selection in the sixth round (the "Championship" game).

An extremely popular feature that some NCAA Tournament bracket contests offer is the potential for entrants to win a large contingent prize for selecting a perfect bracket (correctly predicting the outcome of all 63 games). Selecting a perfect bracket is almost impossible. The NCAA website estimates that actual odds of earning a perfect score are approximately one in 9.2 quintillion. Because of this, many contest operators or sponsors offer incredibly large contingent prizes for anyone who can select a perfect bracket, with the most notable being Quicken Loans, who offered an NCAA Tournament Bracket contest with a one-billion-dollar perfect score prize in 2014.

Filling out a bracket (e.g., making the prediction) is a fairly tedious and time-consuming endeavor as it requires predicting the outcome of at least 63 total games (32 first round games plus 16 second round games plus eight third round games plus four quarterfinal games plus two semifinal games plus one championship game). A large percentage of NCAA Tournament Bracket contest entries are filled out manually on a piece of paper with a printed version of the tournament's draw. Some operators have incorporated a digital interface that makes the process slightly more efficient. However, the size and nature of a full draw or bracket makes it difficult and cumbersome to fill out through a digital interface, especially on a mobile device where screen size may be limited.

Given the sheer number of selections that need be made by a contestant and the time required to complete such brackets, an alternative method for administering a contest for a single elimination bracket tournament is needed that (1) offers a faster and easier way for entrants to place their entries, (2) provides transparency in scoring and the ranking of entries, (3) can easily be administered through a digital interface, especially one that is designed to work in a mobile environment, (4) enables a final ranking of participants, and (5) enables a perfect score prize with long odds, but with odds that are actually achievable.

What is needed is a system that provides a bracket contest that is easier to enter than filling out a complete bracket, having odds that are achievable.

SUMMARY

People are typically more likely to play and enjoy a bracket-based contest or bracket contest, either in traditional form, in digital form, or "video" form, when the requirements and method to place an entry are easier to understand and less complicated, when the rules and mechanics of the bracket contest are easy to learn and understand, and where entrants have the potential to win a large contingent prize. Additionally, people are more likely to place multiple entries into bracket contests when there is less effort required to place an entry, thereby encouraging a greater number of entrants, potentially resulting in more predictable outcomes.

In the following, a participant is a player or team that plays in at least one round of the bracket.

In one embodiment, a bracket contest system is disclosed that includes a server having a set of x participants, each representing a participant in a single elimination bracket with y-rounds of play where the bracket is divided into two halves with each half producing a single participant through single elimination matches to play in a final match, then each half segmented into two sections each producing a single participant through single elimination matches to play in a semi-final match, then each segment into two sub-segments each producing a single participant through single elimination matches to play in a quarterfinal match, and so on and so forth for y−1 iterations.

In another embodiment, a bracket contest system is disclosed including a server. There are a set of matches between participants in a single elimination bracket tournament stored in a memory accessible by the server. Each match is between two of the participants in the single elimination bracket tournament with y-rounds of play in which one half of the participants are eliminated in each round of play. A bracket contest entrant device is connected to the server. The bracket contest entrant device receives predictions before a start of a first match in which each prediction includes of a pre-set number of predicted winners and/or losers of each match in the set of matches starting with a winner of a final match. The predictions are entered sequentially based on a predicted final rank of the participants in order from first place to nth place, where after each selection is made from the bracket contest entrant device, a next selection is limited to participants from a predetermined valid position in the single elimination bracket tournament. After receiving results of the set of matches by the server, a score of the predictions based upon the results is made, and if the score of the predictions exceeds a threshold, the predictions are declared a winning entry.

In another embodiment, a method of scoring a bracket contest includes creating a set of predetermined valid matches in a single elimination bracket tournament, the single elimination bracket tournament comprising a structured set of matches between participants in the single elimination bracket tournament. Before the first match of the set of predetermined valid matches commences, predictions consisting of a pre-set number of predicted participants that are predicted to be winners and/or losers of matches starting with a final match are made. The predictions are made in order from a first-place participant to an nth place participant, where each successive prediction is limited to participants from a predetermined valid position in the single elimination bracket tournament. After selecting the predictions, results of the set of predetermined valid matches are received/entered and scoring of the predictions based upon the results and declaring the predictions as a winning prediction when the scoring of the predictions exceeds a threshold.

In another embodiment, a bracket contest system is disclosed including a server having a set of matches for a single elimination basketball bracket tournament stored in a memory accessible by the server. Each match of the set of matches being between two basketball teams of 64 basketball teams in the single elimination basketball bracket tournament with six rounds of play in which one half of the basketball teams is eliminated in each round of play. A bracket contest entrant device is connected to the server and receives predictions before a start of a first match of the set of matches. Each prediction consisting of a pre-set number of predicted winners and/or losers of each match in the set of matches starting with a winner of a final match. The predictions entered sequentially based on a predicted final rank of a selected basketball team in order from first place to nth place, where each subsequent selection is limited to participants from a predetermined valid position in the single elimination basketball bracket tournament. After results of the set of matches are received by the server, a score of the predictions is made by the server based upon the results of the set of matches and if the score of the predictions exceeds a threshold, the predictions are declared as a winning entry.

In this document, the term, "match," is a competition between two participants having an outcome, usually one participant is the winner and one participant is the loser. The term, "participant," refers to the individual players (e.g., tennis players), teams (e.g., basketball teams), a horse, or other tangible and intangible items. For example, in some embodiments, a participant is a video or a song that is voted on by one or more judges (e.g., official judges or the public). The term, "tournament," refers to a structured set of matches, competitions, or games between two or more opponents (participants) leading to a final match between two final opponents or participants to determine a winner of the tournament. The term, "bracket contest", refers to a game where entrants predict the outcome some or all of the matches of an underlying tournament and/or the results of the tournament as a whole. The term, "entrant," refers to the user of the system who is participating in a bracket contest by making selections or predictions of who/what will win some or all of the matches and/or the underlying tournament. The entrant makes such selections on a bracket contest entrant device that is operatively connected to a device (e.g., a server) that hosts the bracket contest. Note that it is fully anticipated that the opponents/participants are other than teams or players. For example, the tournament is a structured set of matches between inanimate objects such as artwork or songs that are voted to win/lose by viewers/listeners.

In some embodiments, several entrant devices are connected to the server through one or more networks (e.g., local area networks, wireless networks, the Internet, mobile phone service). Before the tournament starts, for each entry by an entrant, the entrant devices accept a pre-set number of entrant selections or a pre-set number of predicted winners, n, entered sequentially based on the predicted final rank of the selected participant in order from first place to nth place, where after the first selection is made from the entire field of participants, each additional selection is limited to a subset of participants that produces a feasible bracket by way of a predetermined valid position in the single elimination bracket tournament. The predetermined valid position excludes selections that result in a bracket that will not generate a real tournament outcome. For example, the first selection must be a first-place participant. The second selection, which represents a prediction of the runner-up, must be from the opposite half of the bracket from the participant selected as the first-place participant. This is because selecting a participant to be runner-up from the same half of the bracket as the participant selected to be the winner (first-place) produces an infeasible bracket as there is no way two participants from the same half of the bracket can finish as the first-place participant and as the second-place participant as one will be eliminated by the other before the final game.

The available participants for the third selection (3rd place) and fourth selection (4th place) are further limited to participants that fall in the other sections as sections of the participants selected to be the 1st place and 2nd place participants. This is because the 3rd and 4th place participants are participants that lose to the first-place participant and to the second-place participant in the semi-finals. During the next selections, the field of available participants is reduced even further to the participants that are in subsequent sub-sections, but the same sub-section, as the first-place participant, to the second-place participant, etc. By requiring the entrant to select the top n finishing participants in order, the outcome of the bracket contest is influenced by the skill and knowledge of the entrants. Additionally, because it is required that the selections be made in order from the first-place participant and the second-place participant, there will be a greater number of correct single-game predictions than n. For example, in a 64-participant single elimination tournament, requiring entrants to predict the top eight finishing participants (n=8) is equal to requiring the correct prediction of 31 games. This is because a participant must win at least three consecutive matches to make it to the quarterfinals (the 3rd round), which equals 24 correct picks, and then four correct picks for the quarterfinal games, two correct picks for the semi-finals and then one correct pick for the final game, which is a total of 31 games. Once the tournament starts, no further entries are accepted and the bracket contest system tracks the results of the tournament. Entrants are awarded points based on the final rank of their selected participants. For example, an entrant might earn zero points for a participant selected that was eliminated in the first round (i.e. participants with a final rank of 64th to 33rd), 100 points for a that reaches the 2nd round of play (i.e. participants with a final rank of 32nd to 17th), 200 points for a participant that reaches the next round or Sweet 16 (i.e. participants with a final rank from 16th to 9th place), 400 points for predicting the 8th place participant, 425 points for the 7th place participant, 450 points for the 6th place participant, 475 for the 5th place participant, 800 for the $4^{th}$ place participant, 850 for the 3rd place participant, 1,600 for the runner-up and 3,200 for the champion. Additionally, the bracket contest system might award bonus points when a participant finishes in the exact position predicted. For example, double points might be awarded when a participant that is predicted to win actually wins (3,200+3,200 bonus=6,400). In some embodiments, the bracket contest system scores or ranks the entries based on relative performance and to award prizes to each qualifying entrant based on the final rank of their entry to determine if the entrant's entry is a winning entry. In some embodiments, the bracket contest system also has a way to score the entrants' selections, and to award prizes to each qualifying entrant based on an objective score, such as a points milestone (e.g., a threshold), the number of correctly selected participants that finish in the top n regardless of order or the number of correctly selected participants that finish in exact order predicted. For example, a prize could be awarded to any entrant, where n=8, who correctly picked all eight participants that reached the Elite 8, regardless of order, or achieved a perfect score by picking all eight participants in exact order.

In an alternate embodiment, it is contemplated that the above disclosed bracket contest system is applied to NCAA Men's Basketball Tournament where each of the participants in the plurality of matches represents a basketball team participating in the NCAA Men's Basketball Tournament, where the basketball teams are segmented into four sections or "Regions" of 16 basketball teams (18 where a First Four match leads to a birth) labeled East, West, South and Midwest; where East and West are on one side or mutually exclusive half of the bracket and South and Midwest are on the other. In each respective region, each basketball team (participant) is positioned according to their rank or seeding as determined by the tournament's committee. Each Region is then further divided into two sub-sections of eight sequentially grouped teams starting with the basketball team listed at the top of the regional bracket (i.e., East (A), representing the first eight basketball teams listed in the East Region and East (B), representing the second eight basketball teams listed in the East Region, and so on and so forth). If more or less selections are required, additional or fewer divisions will be required.

Again, there are several entrant devices connected to the server through one or more networks. Before the tournament starts, each entrant device accepts an entry or prediction of eight selections made by an entrant, entered sequentially based on the predicted final rank of the selected basketball team in order from $1^{st}$ place to $8^{th}$ place, where after the first selection is made from the entire field of basketball teams (i.e., all regions), each additional selection is limited by a predetermined valid position to a subset of basketball teams that produces a feasible bracket. In such, it is possible to earn a perfect score, for example, by selecting the winning basketball teams from $1^{st}$ place to $8^{th}$ place. For example, if the first selection (for $1^{st}$ place team) is a basketball team from the East Region, then the second selection, which represents a prediction of the runner-up, must be from the opposite side of the bracket (i.e., the South or Midwest). This is because selecting a basketball team to finish in $2^{nd}$ place from the same side of the bracket as the basketball team selected to be the winner ($1^{st}$ place) produces an infeasible bracket as there is no way for two basketball teams from the same half of the bracket to finish $1^{st}$ and $2^{nd}$ as one will be eliminated by the other before the final game.

The available basketball teams (participants) for the third selection (3rd place) are further limited to basketball teams that fall in the other region from the same side of the bracket as the team selected to be the $1^{st}$ place team. In our example, this would be the 16 basketball teams from the West Region. This is because the $3^{rd}$ place basketball team is the basketball team that loses to the $1^{st}$ place basketball team in the semi-finals. Following this methodology, the $4^{th}$ place basketball team must be from other region on the same side as the $2^{nd}$ place basketball team, or in our example, the Midwest.

In an alternate embodiment, the third prediction ($3^{rd}$ place participant) is made as to the participant the comes from one of the two regions that the $1^{st}$ place participant and the $2^{nd}$ place participant came, and $4^{th}$ place participant comes from the remaining region from which the $1^{st}$ place participant, $2^{nd}$ place participant and $3^{rd}$ place participant did not come. Note that in this embodiment, the $3^{rd}$ place participant and $4^{th}$ place participant are decided based on an objective criteria such as point differentials. A similar process is employed for to $5^{th}$ place participant through the $8^{th}$ place participant. For example, selection for $5^{th}$ place participant is from the sub-sections that didn't produce one of the top 4 place participants, and so on.

During the next four selections, the field of available basketball teams to be selected is reduced even further to the eight basketball teams that are in the opposite sub-section, but same region, as the $1^{st}$, $2^{nd}$, $3^{rd}$, and $4^{th}$ placed basketball teams, respectively. In this example, for the $5^{th}$ place selection, the entrant is limited to the eight basketball teams from the East (B) sub-section. By requiring the entrant to select the top 8 finishing basketball teams in order, the outcome of the bracket contest is influenced by the skill and knowledge of the entrants. Additionally, because it is required that the selections be made in order, each selection equates to a greater number of correct single-game predictions than required in prior bracket contest formats. For example, requiring the selection of the top 8 finishing teams requires the correct prediction of at least 31 games. This is because a basketball team must win at least three consecutive games, starting with the first round, to make it to the Elite 8. Since there are eight selections to be made, this equals 24 correct game selections, and then four correct selections for the Elite 8 games, two correct selections for the Final 4 games and then one correct selection for the final game, which is a total of 31 game selections. Once the tournament starts, no further entries are accepted and the bracket contest system tracks the results of the tournament and generates scoring for the entrants in the bracket contest. Entrants are awarded points based on the final rank of their selected basketball teams. For example, in one embodiment, an entrant earns zero points for a basketball team selected that was eliminated in the first round (i.e. basketball teams with a final rank of $64^{th}$ to $33^{rd}$), 100 points for a basketball team selected that reaches the $2^{nd}$ round of play (i.e. basketball teams with a final rank of $32^{nd}$ to $17^{th}$), 200 points for a basketball team selected that reaches the Sweet 16 (i.e. basketball teams with a final rank from $16^{th}$ to $9^{th}$ place), 400 points for predicting the $8^{th}$ place basketball team, 425 points for the $7^{th}$ place basketball team, 450 points for the 6th place basketball team, 475 for the $5^{th}$ place basketball team, 800 for the 4th place basketball team, 850 for the $3^{rd}$ place basketball team, 1,600 for the runner-up and 3,200 for the champion. Additionally, in some embodiments, the bracket contest system awards bonus points when a basketball team finishes in the exact position predicted. For example, double points might be awarded when a basketball team that is predicted to win actually wins (3,200+3,200 bonus=6,400). In some embodiments, the bracket contest system ranks the entries based on relative performance and awards prizes to each qualifying entrant based on the final rank of their entry. In some embodiments, the bracket contest system scores the entrants' selections, and awards prizes to each qualifying entrant based on an objective score, such as a points milestone or threshold, the number of correctly selected basketball teams that finish in the top n regardless of order or the number of correctly selected basketball teams that finish in exact order predicted. For example, a prize is awarded to any entrant, where n=8, who correctly picked all eight basketball teams that reached the Elite 8, regardless of order, or achieved a perfect score by picking all eight basketball teams in exact order.

In alternate embodiments, it is contemplated that the previously described systems are applied to single elimination bracket tournaments for other popular sporting tournaments, such as tennis (i.e., ATP and WTA events) and a variety of Olympic events, or hybrid tournaments that combine an initial round robin stage with a single elimination bracket tournament for qualifiers such as the FIFA World Cup, the Rugby World Cup, and the Cricket World Cup.

BRIEF DESCRIPTION OF THE DRAWINGS

The invention can be best understood by those having ordinary skill in the art by reference to the following detailed description when considered in conjunction with the accompanying drawings in which:

FIGS. 4A, 4B, and 4C illustrate user-interfaces that enables an entrant to select the first of four participants in a tournament of the present invention.

FIGS. 5A, 5B, and 5C illustrate user-interfaces that enables the entrant to select the second of four participants in a tournament of the present invention.

FIGS. 7A, 7B, and 7C illustrate the user-interfaces that enables the entrant to select the fourth and final of four participants in a tournament of the present invention.

FIGS. 8A, 8B, and 8C illustrate graphic bracket contest user-interfaces after the underling typical 64-participant single elimination bracket tournament has ended.

FIG. 9 illustrates the number of choices required to complete a bracket contrasting the current methods and the disclosed method.

FIGS. 10A, 10B, and 10C illustrate the user-interfaces that enables the entrant to select a first participant of four participants in a tournament in which an objective criterion is used to determine the $3^{rd}$ and $4^{th}$ place participants.

DETAILED DESCRIPTION

Figure 1:
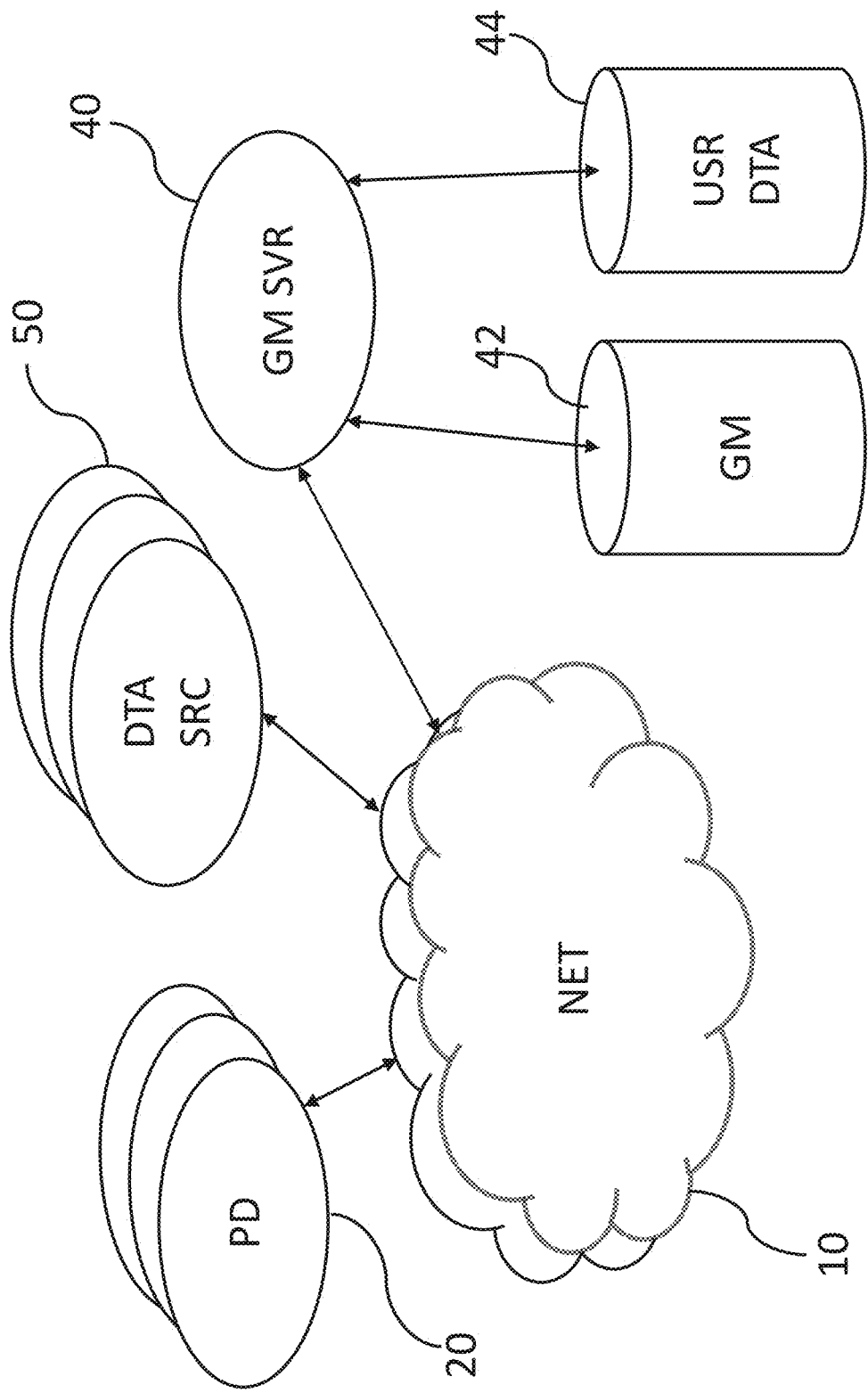
FIG. 1 illustrates a schematic view of a gaming system.

Reference will now be made in detail to the presently preferred embodiments of the invention, examples of which are illustrated in the accompanying drawings. Throughout the following detailed description, the same reference numerals refer to the same elements in all figures.

Again, throughout this document, the term, "match," is a competition between two participants having an outcome, usually one participant is the winner and one participant is the loser. The term, "participant," refers to the individual players (e.g., tennis players), teams (e.g., basketball teams), a horse, or other tangible and intangible items. For example, in some embodiments, a participant is a video or a song that is voted on by one or more judges (e.g., official judges or the public). The term, "tournament," refers to a structured set of matches, competitions, or games between two or more opponents (participants) leading to a final match between two final opponents or participants to determine a winner of the tournament. The term, "bracket contest", refers to a game where entrants predict the outcome some or all of the matches of an underlying tournament and/or the results of the tournament as a whole. The term, "entrant," refers to the user of the system who is participating in a bracket contest by making selections or predictions of who/what will win some or all of the matches and/or the underlying tournament. The entrant makes such selections on a bracket contest entrant device that is operatively connected to a device (e.g., a server) that hosts the bracket contest. Note that it is fully anticipated that the opponents/participants are other than teams or players. For example, the tournament is a structured set of matches between inanimate objects such as artwork or songs that are voted to win/lose by viewers/listeners.

In some embodiments, the participants are inanimate, for example, songs, in which the tournament includes matches between two of the songs, the winner of the matches determined by judges or listener popularity.

Referring to FIG. 1, a schematic view of a gaming system is shown. Multiple entrant devices 20 (computers, smart phones, etc.) connect to the game server 40 through a network 10, for example, through the Internet, wireless local-area or wide-area networks, wired local-area networks, cellular networks.

Game details and settings are stored in a game storage area 42, such as, the list of games to be simulated, the list of players for selection by the participants, the starting date and time, the ending date and time, the number of players that each participant must select, and predetermined valid position of selections in the bracket tournament.

The data sources 50 includes any reputable source of outcomes of matches and/or tournaments such as newspapers (e.g., USA Today), sport-based services, financial services, racetrack web sites, etc. In some embodiments, the data is directly accessed from the data sources 50, through a network 10 (e.g., the Internet), while in other embodiments, the data is manually entered into the game server 40 through a user interface.

Figure 2:
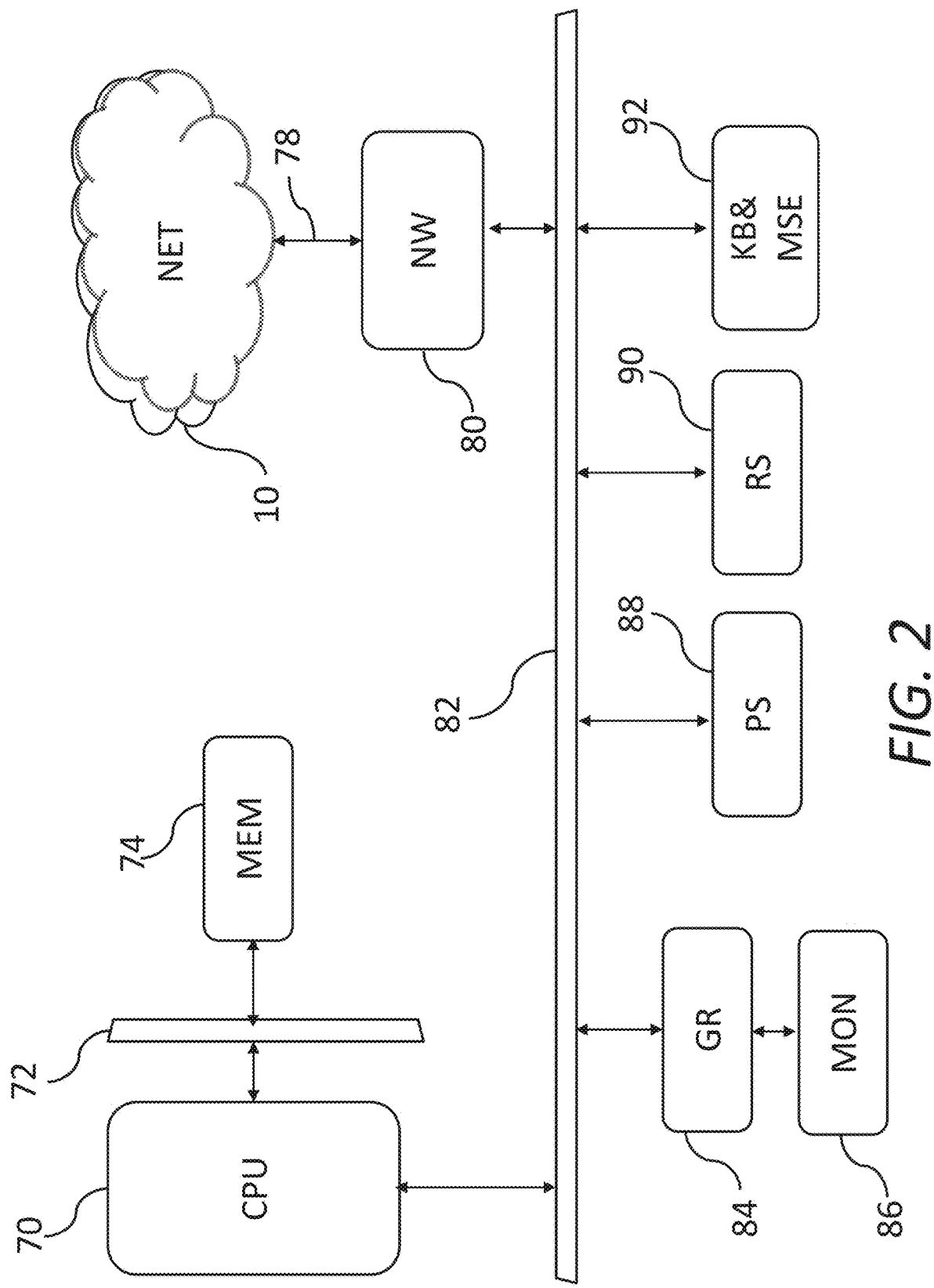
FIG. 2 illustrates a schematic view of a typical computer system.

Referring to FIG. 2, a schematic view of a typical computer system is shown. The example computer system represents a typical computer system used as the game server 40 and/or the entrant devices 20. The example computer system is shown in its simplest form, having a single processor. Many different computer architectures are known that accomplish similar results in a similar fashion and the present invention is not limited in any way to any particular computer system. The present invention works well utilizing a single processor system, as shown in FIG. 2, a multiple processor system where multiple processors share resources such as memory and storage, a multiple server system where several independent servers operate in parallel (perhaps having shared access to the data), or any combination, etc. In such systems, a processor 70 executes or runs stored programs that are generally stored for execution within a memory 74. The processor 70 is any processor or a group of processors, for example an Intel Pentium-4® CPU or the like. The memory 74 is connected to the processor, for example, by a memory bus 72 and is any memory 74 suitable for connection with the selected processor 70, such as SRAM, DRAM, SDRAM, RDRAM, DDR, DDR-2, etc. Also interfaced to the processor 70 is a system bus 82, for example, interfacing peripheral subsystems such as a network interface 80, persistent storage 88 (e.g., a hard disk, solid state disk), removable storage 90 (e.g., DVD, CD, flash drive), a graphics adapter 84 and a keyboard/mouse 92, etc., to the processor 70. The graphics adapter 84 receives commands and display information from the system bus 82 and generates a display image that is displayed on the display 86.

In general, the persistent storage 88 is used to store programs, executable code, and data such as user financial data in a persistent manner. The removable storage 90 is used to load/store programs, executable code, images, and data onto the persistent storage 88.

These peripherals are examples of persistent storage 88 and other examples of persistent storage 88 include flash memory, magnetic memory, etc. Other examples of removable storage 90 include CDRW, DVD, DVD writeable, Blu-ray, SD cards, other removable flash media, floppy disk, etc. In some embodiments, other local devices are connected to the system through the system bus 82 or with other input-output connections/arrangements as known in the industry. Examples of these local devices include printers; graphics tablets; joysticks; and communications adapters such as modems and Ethernet adapters.

The network interface 80 connects the computer-based system to the network 10 through a link 78 which is, preferably, a high-speed link such as a cable broadband connection, a Digital Subscriber Loop (DSL) broadband connection, fiber optics, a T1 line, or a T3 line.

Figure 3:
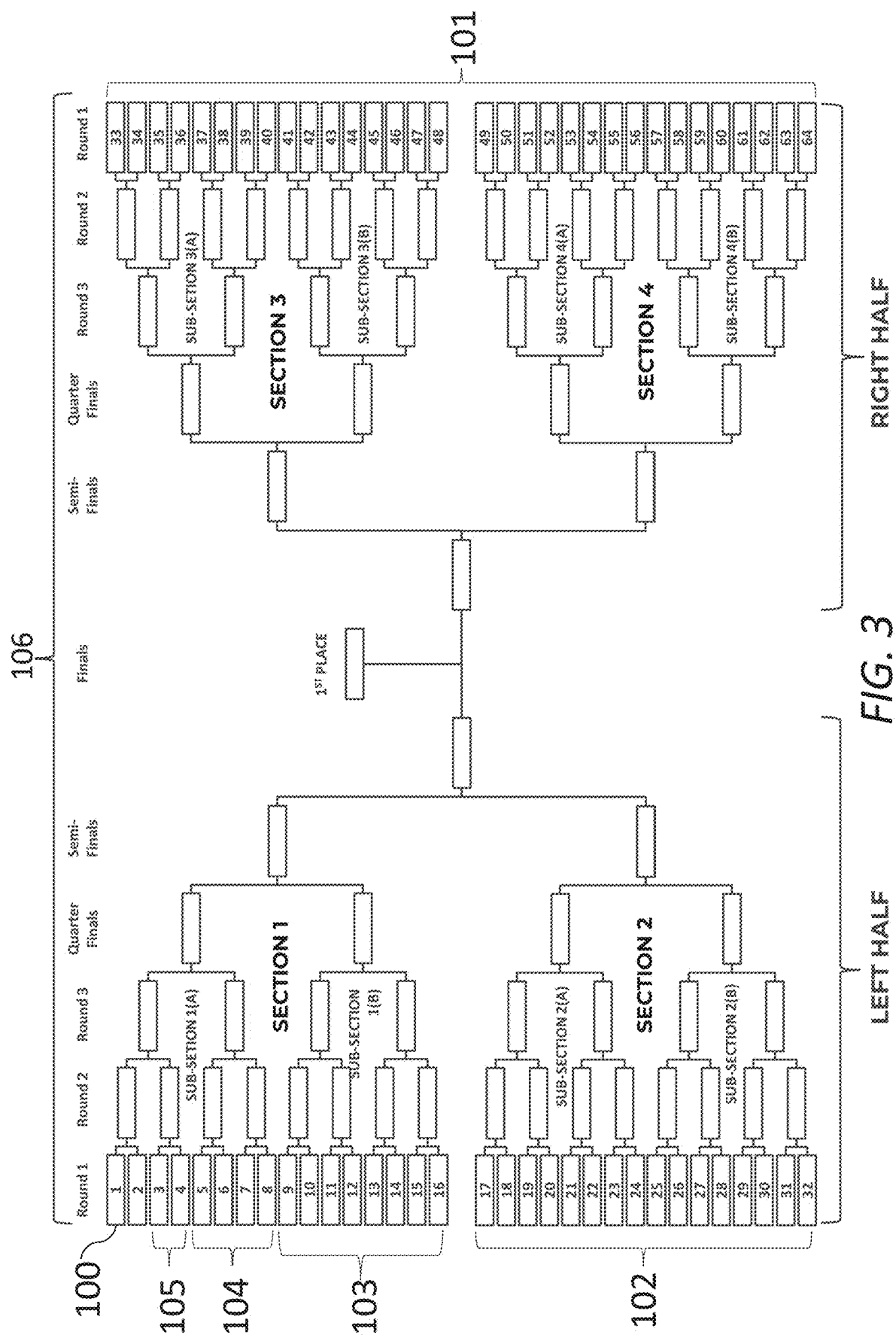
FIG. 3 illustrates a typical initial user-interface for the game format of a typical 64-participant single elimination bracket tournament of the present invention.

Referring to FIG. 3, a graphic representation of a typical 64-participant single elimination bracket tournament where each participant in the tournament is assigned a participant location 100 numbered between one and 64 in the tournament, where each participant location falls into a side 101, which is represented by one-half of the participants (e.g., 32 participants), further divided into sections 102, which represents one-half of one side (e.g., 16 participants), and sub-section 103, which is represented by one-half of a section (e.g., eight participants), and further divided into a sub-sub-section 104, which is represented by one-half of a sub-section (e.g., 4 participants, and further divided into single matches 105 between pairs of participants. The rounds of play 106 are broken down into six rounds starting with the first round (32 matches) and culminating in the tournament finals (single match).

Referring to FIGS. 4A, 4B, and 4C, a user-interface for an entrant to make an entry in the bracket contest by selecting the top four participants in the tournament is shown. The selection window 107 shown in FIGS. 4A and 4C includes a bracket contest title and sub-title 108, an indicator 109 for the number of entries submitted to date, and an entry deadline countdown clock 110. The selection window 107 also contains a confirmation button 111 that is deactivated (e.g., not selectable by the entrant) until all required selections or predictions have been made. The selection window 107 includes four selection rows with the first selection row 121 activated and place labels 113 positioned to the left of each row. The selection window 107 initially only displays the option for the $1^{st}$ place selection in the first selection row 121 and provides a selection button 114 that when depressed, opens the available participant window 115 of FIG. 4B. Note that due to an often large number of participant 116 in the participant window 115, in some user interfaces, a scroll bar 119 is provided.

In some embodiments, information is displayed in the selection window 107 and/or available participant window 115 such as the number of entries received 109, an entry deadline countdown clock 110, and a list of sections 117 from which available participants 116 are possibly selected.

Operating the selection button 114 of the selection window 107 brings up the available participant window 115 of FIG. 4B. In the available participant window 115, the available participants 116 are listed and are, for example, grouped based on each participant's slot in the tournament draw. Each available participant has an entry confirmation button 118 for selection from the available participants 116. When the entry confirmation button 118 is depressed, the selected available participant from the list of available participants 116 is added in the relevant slot in the first selection row 121 of the selection window 107. Once a participant has been selected, the selection window 107 is again displayed showing the selected participant, the confirmation button appears, but remains deactivated until the number of remaining required selections are completed. In FIG. 4C, the participant selected from the available participant window 115 appears in the first selection row 121 and a remove button 120 now appears next to the participants name to enable the entrant to remove a selected participant from the selection row 112. The second selection row 123 of the selection window 107 is now populated with the selection button 114 and the next selection, the $2^{nd}$ place selection, is made.

Figure 4D:
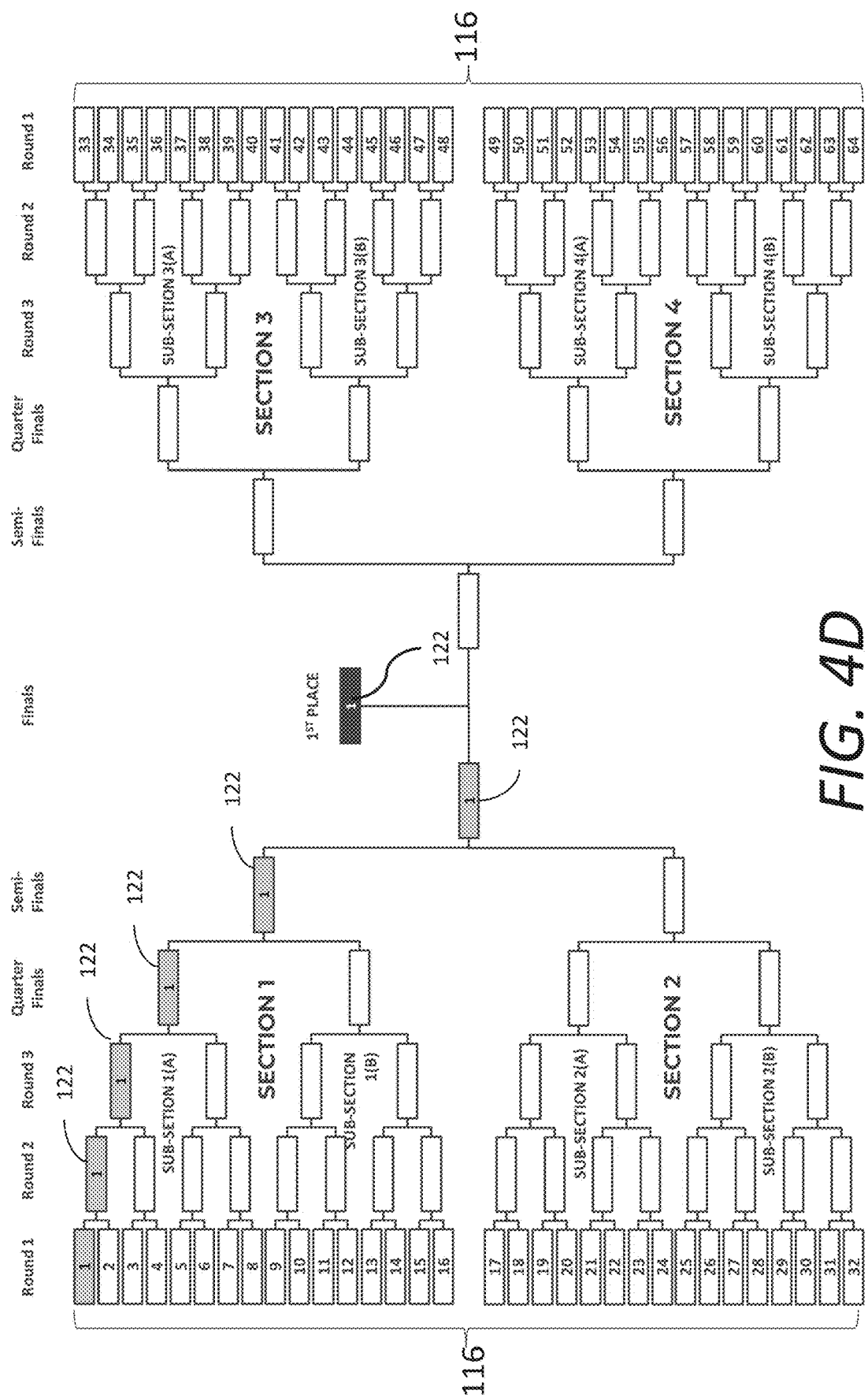
FIG. 4D illustrates the typical 64-participant single elimination bracket tournament after a predicted first place participant has been selected by the entrant.

Referring to FIG. 4D, represents a graphic representation of the entrant's selections where the list of available participants 116 from the available participant window 115 are shown, along with the representation of the selection of the $1^{st}$ place participant in the first selection row 121, and the prediction of each winning match 122. Therefore, by selecting only the $1^{st}$ place participant, the entrant is effectively predicted the outcome of six matches. Note that the entrant selected the first participant to win the tournament, therefore, in order to make it to the final match (and win the final match), the first participant must win round 1, round 2, round 3, quarter finals, semifinals, and the final.

Referring to FIGS. 5A, 5B, and 5C, the user interface for the entrant to select the top four participants in the tournament is shown. In this example, the entrant selects the selection button 114 in the in the second selection row 123 of the selection window 107 of FIG. 5A for the $2^{nd}$ place selection and the available participants 116 of FIG. 5B are displayed having only participants from the opposite side of the bracket. This is because the second-place participant has to come from the other side of the bracket from which the first-place participant comes. After the entry confirmation button 118 is selected for participant 35, the selection window 107 is displayed with the second selection row 123 for $2^{nd}$ place populated by the selected participant (e.g., participant 35) and the selection button 114 is replaced by a remove button 120. As shown in FIG. 5C, the third selection row 125 is then activated with the slot's information and a selection button 114. Note that in some embodiments, text within the confirmation button 111 is updated to indicate that two selections remain.

Figure 5D:
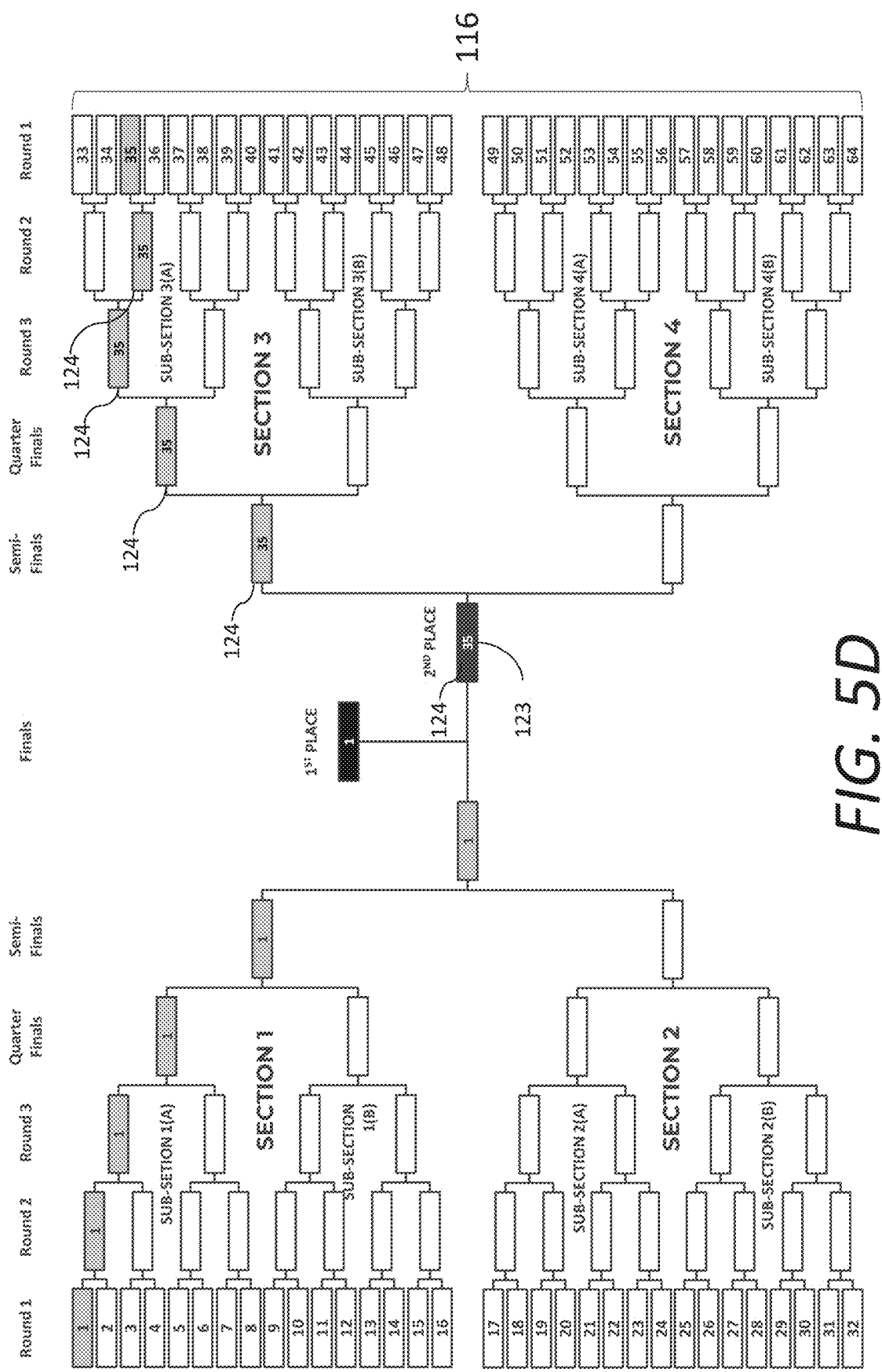
FIG. 5D illustrates the typical 64-participant single elimination bracket tournament after a predicted second place participant has been selected by the entrant.

Referring to FIG. 5D, represents a graphic representation of the entrant's previous selections where the selected participants are shown, now including the selection of the $2^{nd}$ place participant in the second selection row 123, and the prediction of each winning match 124 by the $2^{nd}$ place selection. By making a prediction of the $2^{nd}$ place winner, the entrant has now effectively predicted the outcome of 11 games.

Figures 6A, 6B, 6C:
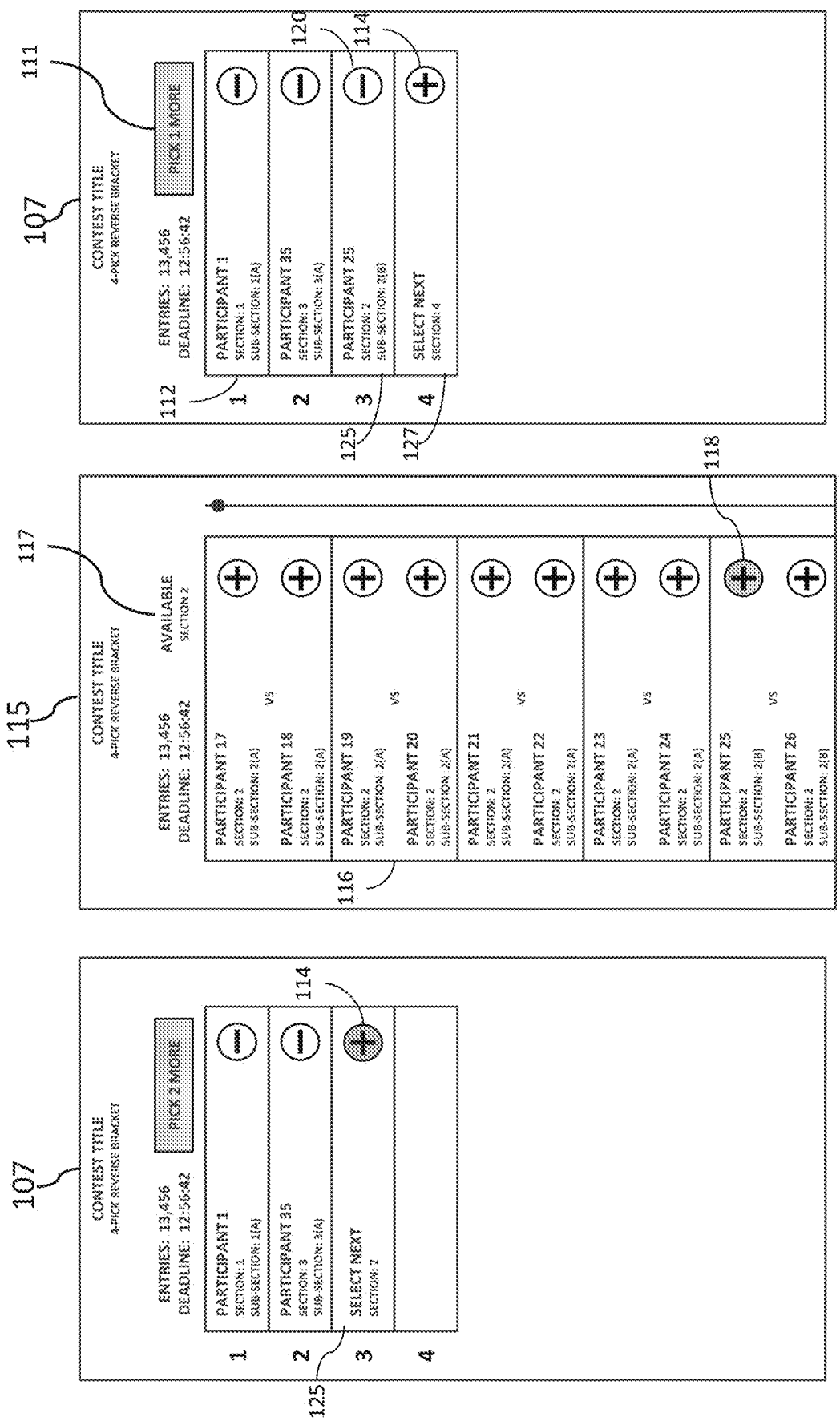
FIGS. 6A, 6B, and 6C illustrate the user-interfaces that enables the entrant to select the third of four participants in a tournament of the present invention.

Referring to FIGS. 6A, 6B, and 6C, the user interface for the entrant to select the top four participants in the tournament is shown, this time the entrant selects the selection button 114 in the third selection row 125 of the selection window 107 of FIG. 6A for the $3^{rd}$ place selection and the available participants 116 of FIG. 6B are displayed. After the entry confirmation button 118 is selected (e.g., for participant 25), the selection window 107 is displayed with the third selection row 125 for $3^{rd}$ place populated by the selected participant (e.g., participant 25) and the selection button 114 is replaced by a remove button 120. As shown in FIG. 6C, the fourth selection row 127 is then activated with the slot's information and a selection button 114. Note that in some embodiments, text within the confirmation button 111 is updated to indicate that only one selection remains.

Figure 6D:
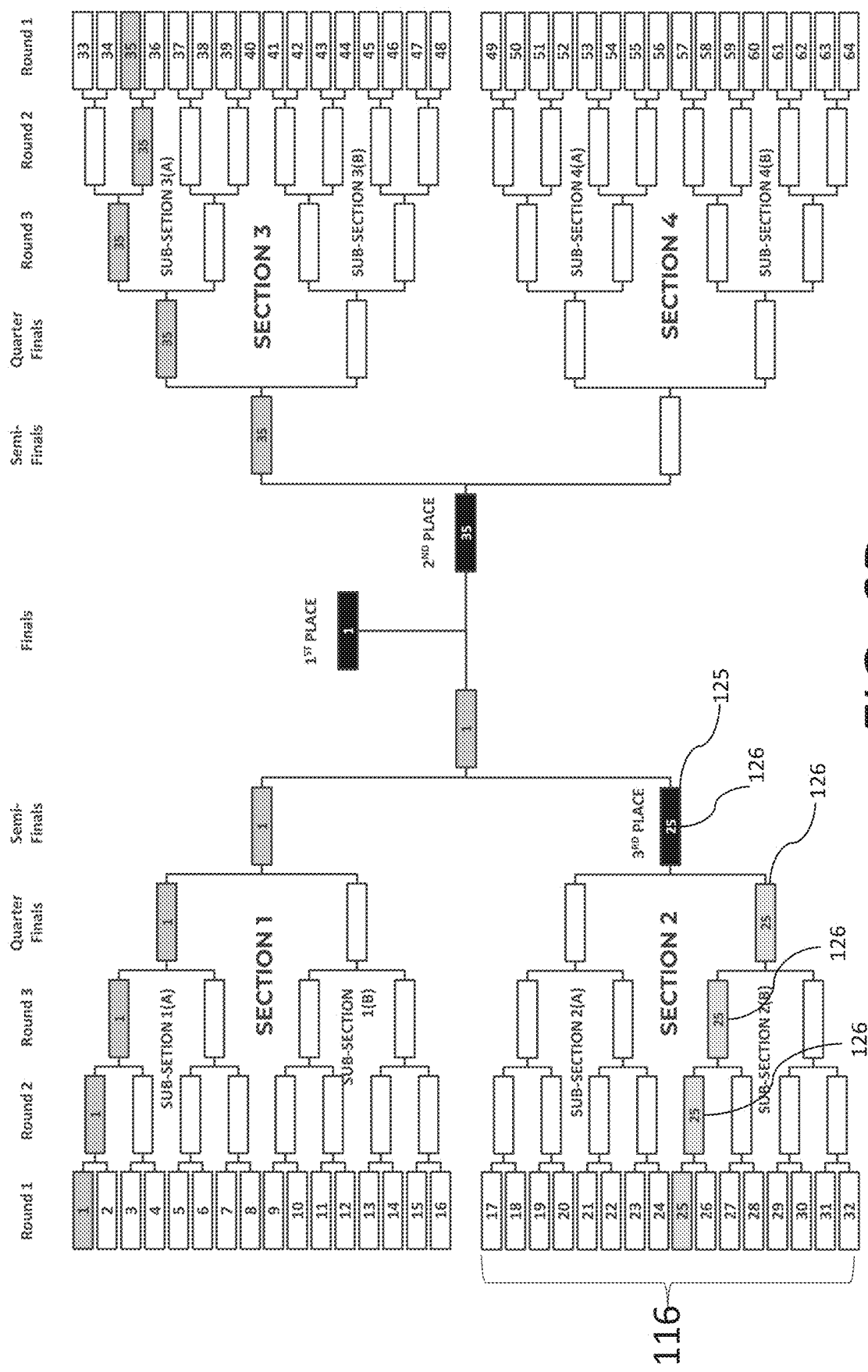
FIG. 6D illustrates the typical 64-participant single elimination bracket tournament after a predicted third place participant has been selected by the entrant.

Referring to FIG. 6D, a graphic representation of the entrant's previous selections where the selected participants are shown, now including the prediction of the $3^{rd}$ place participant in the third selection row 125, and the prediction of each of the winning matches 126 by the $3^{rd}$ place selection. By selecting the $3^{rd}$ place participant, the entrant has now effectively predicted the outcome of 15 games.

Figures 7A, 7B, 7C:
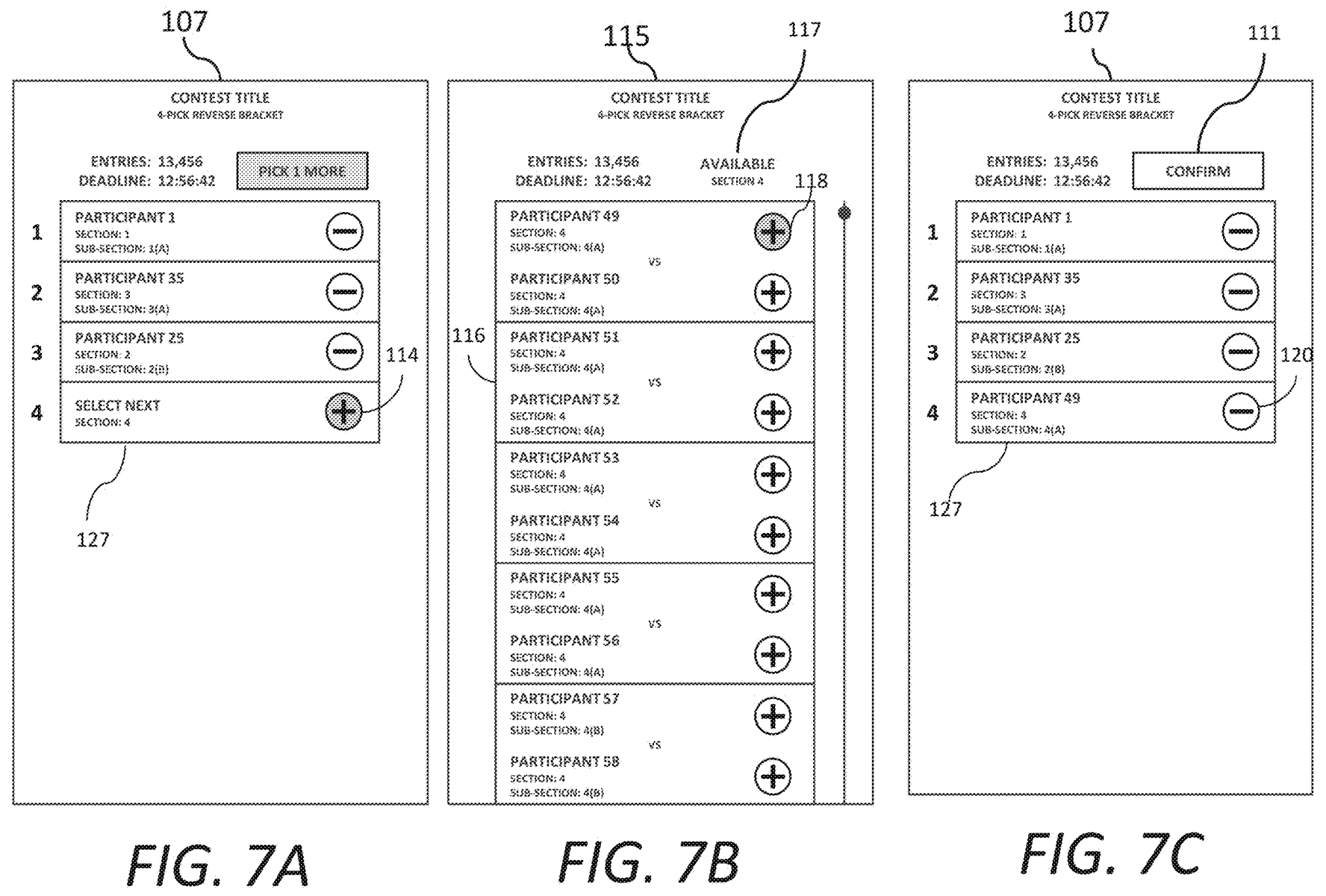

Referring to FIGS. 7A, 7B, and 7C, the user interface for the entrant to select the top four participants in the tournament is shown, this time the entrant selects the selection button 114 in the fourth selection row 127 of the selection window 107 of FIG. 7A for the $4^{th}$ place selection and the available participants 116 of FIG. 7B are displayed. After the entry confirmation button 118 is selected (e.g., for participant 49), in FIG. 7C, the fourth selection row 127 of the selection window 107 is displayed with the selected 4$^{th}$ place participant (e.g., participant 49) and the selection button 114 is replaced by a remove button 120. Note that in some embodiments, text within the confirmation button 111 is updated to indicate that no further selections remain.

Figure 7D:
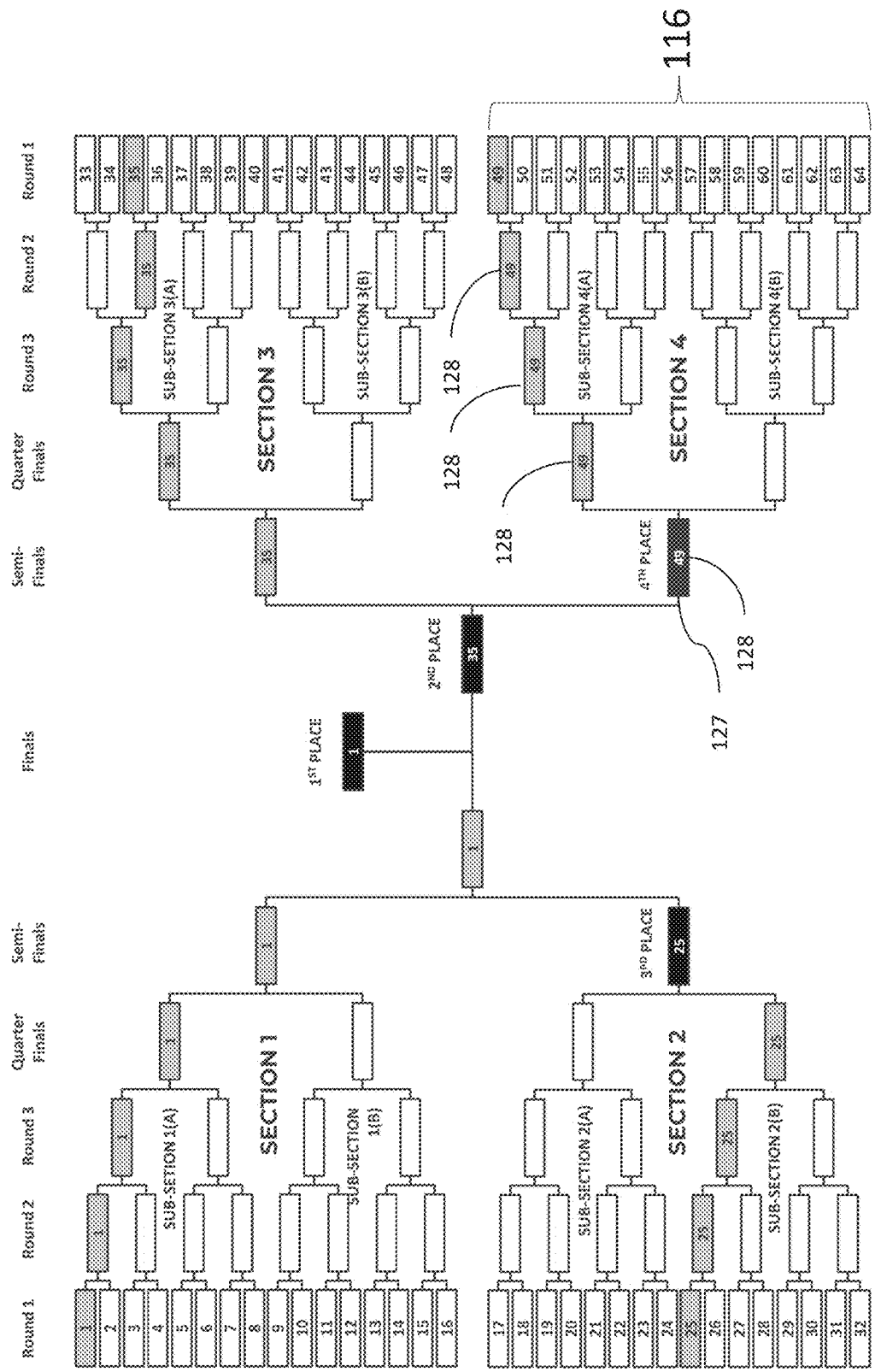
FIG. 7D illustrates the typical 64-participant single elimination bracket tournament after a predicted fourth place participant has been selected by the entrant.

Referring to FIG. 7D, a graphic representation of the entrant's previous selections where the selected participants are shown, now including the selection of the 4$^{th}$ place participant in the fourth selection row 127, and the prediction of each of the winning matches 128 by the 4$^{th}$ place selection. By selecting the 4$^{th}$ place winner, the entrant has now effectively predicted the outcome of 19 games.

Referring to FIGS. 8A, 8B, and 8C, user-interfaces providing results of the bracket contest is shown after the tournament completes. In FIG. 8A, the scoring screen 220A has been activated by selecting the scoring menu button 226. In this, the entrant's final score 222 is displayed, the entrant's final rank 223 is displayed and the prize won 224 by the entrant is displayed. The scoring for each participant selection is detailed in the scoring table 225.

By selecting the "my picks" feature 227, the entrant's selection screen 220B is displayed showing the entrant's participant selections 230 in the selection performance table 231 with the predicted place of the participant selection 230 adjacent to each selection slot. Each entrant's participant selections 230 includes the actual place finished (e.g., 12$^{th}$ place) and the total points and bonus points awarded for that entrant's participant selections 230 The total points and bonus points 232 are displayed as calculated below.

By selecting the leaders' menu feature 228 is clicked, the screen shifts to the leaderboard screen 220C and the leaderboard table 234 is displayed and contains the entry's score, entry number, entrant's name, and other information such as the entrant's location. The entry's rank 235 is displayed adjacent to each entry's respective slot in the leaderboard table and a scroll 236 is provided to permit the entrant to view entrants that ranked well.

The above example references a bracket contest where entrants are required to select the top four finishing participants, the 3$^{rd}$ place is the participant that loses to the 1$^{st}$ place finisher in the semi-finals and 4$^{th}$ place is the team that loses to the 2$^{nd}$ place finisher in the semi-finals. wherein alternate embodiments, the two teams that lose in the semi-finals play a consolation match to determine 3$^{rd}$ and 4$^{th}$ places. When this occurs, the selection of the 3$^{rd}$ place participant would be limited to the two sections other than the sections from which the 1$^{st}$ place participant and 2$^{nd}$ place participant were selected. The 4$^{th}$ place selection would then be limited to participants from the remaining section. It is further anticipated that in some embodiments, the 3$^{rd}$ place participant and 4$^{th}$ place participant are decided by objective mechanisms such as comparing point differentials.

Other embodiments include bracket contests in which entrants are required to pick as many eight, or even 16 participants. When this occurs, the entrant inputs are similar to the above to produce a feasible bracket. In other words, a bracket that is possible based on the draw.

Referring to FIG. 9, a table indicating the number of decisions required for an entrant to complete a entry for a bracket contest is shown, comparing the number of decisions required to complete a an entry for a bracket contest using existing methods to the number of decisions required to complete an entry for an equal bracket contest using the disclosed methods.

In the first column of FIG. 9, the number of participants, n is shown such as 8 participants up to 256 participants. The second column shows the number of selections required to be made for a standard bracket of n participants (e.g., the prior art). For example, if the number of participants is 8, then one must select the winners of the first round (4 selections), then the winners of the second round (2 selections), then the winner of the tournament (1 selection) for a total of 7 selections. By using the reverse bracket method, the number of selections that need to be made (shown in the third column) is reduced to 3, the winner of the tournament, the winner of the 2$^{nd}$ round that went on to be the winner of the tournament, and the winners of the 1$^{st}$ round that went on to the second round. Looking at the fifth column, the number of selections to complete a bracket is reduced by almost half by using the disclosed methods. Although this is not a huge number for a tournament of 8 participants, when selecting brackets for tournaments with a large number of participants like 128 or 256, the reduction in the number of selections is 63 and 127 respectively, requiring far less time (and decision making) on behalf of the entrant to the bracket contest. This savings in number of decisions makes completing an entry more appealing to those who, for example, have a set of favorite teams, one from each side of the bracket, allowing completion of the bracket in a much shorter period of time. In such, if it takes fifteen seconds to think about a decision and enter a selection through a user interface, reducing 63 selections (bracket of 128 participants) saves 63*15 seconds, or 945 total seconds, or almost 16 minutes. As many have a hunch, desire, premonition, feel for the final set of participants that will be playing, as well as the participant that will win the tournament, the disclosed system will reduce the decisions required for participants that are believed to have no bearing on the outcome of the tournament.

Referring to FIGS. 10A, 10B, 10C, 11A, 11B, 11C, 12A, 12B, 12C, 13A, 13B, and 13C, user-interfaces for an entrant to make entries in a bracket contest version in which an objective criterion is used to determine the 3$^{rd}$ and 4$^{th}$ place participants is shown. The selection window 107 shown in FIGS. 10A, 10C, 11A, 11C, 12A, 12C, 13A, and 13C includes a bracket contest title and sub-title 108, an indicator 109 for the number of entries submitted by all entrants to date, and an entry deadline countdown clock 110. The selection window 107 also contains a confirmation button 111 that is deactivated (e.g., not selectable by the entrant) until all required selections or predictions have been made. In some embodiments, the confirmation button 111 indicates the total number of picks that still need to be made ("PICK 4").

The selection window 107 includes four selection rows with the first selection row 121 activated and place labels 113 positioned to the left of each row. The selection window 107 initially only displays the option for the 1$^{st}$ place participant selection and provides a selection button 114 that when depressed, opens the available participant window 115 of FIG. 10B.

Figure 11C:
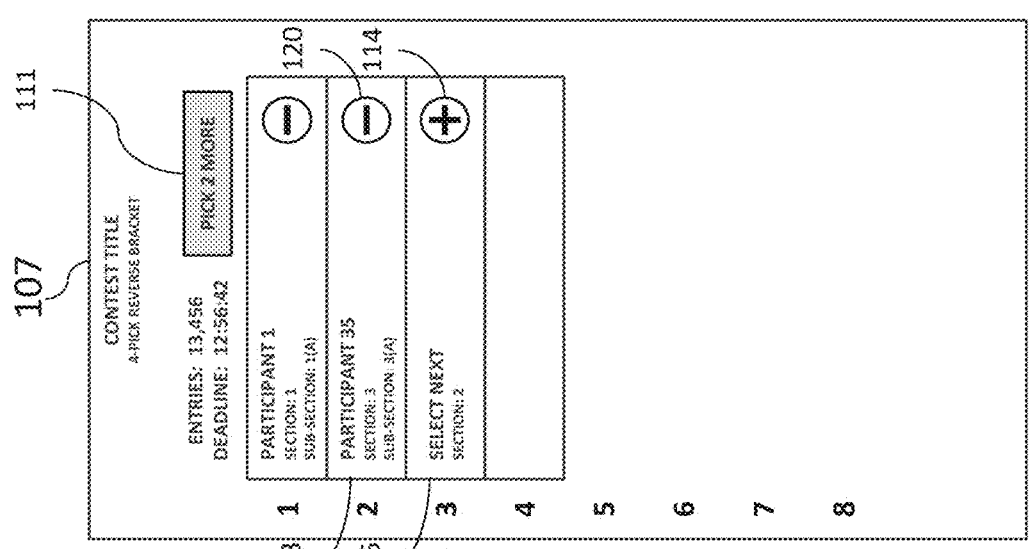
FIGS. 11A, 11B, and 11C illustrate the user-interfaces that enables the entrant to select a second participant of four participants in the tournament in which an objective criterion is used to determine the $3^{rd}$ and $4^{th}$ place participants.

Operating the selection button 114 of the selection window 107 brings up the available participant window 115 of FIG. 10B. In the available participant window 115, the available participants 116 are listed and are, for example, grouped based on each participant's slot in the tournament. Each of the available participants 116 has an entry confirmation button 118. In FIG. 10C, after the entry confirmation button 118 is depressed, the selected participant is added in the relevant slot in the first selection row 121 of the selection window 107 and a remove button 120 now appears next to the participant's name to enable the entrant to remove the selected participant from the first selection row 121. The confirmation button 111 appears, but remains deactivated until the number of remaining required selections are completed. The second selection row 123 of the selection window 107 is now populated with the selection button 114 and the next selection, the $2^{nd}$ place selection, is made as shown in FIGS. 11A, 11B, and 11C.

Figure 11B:
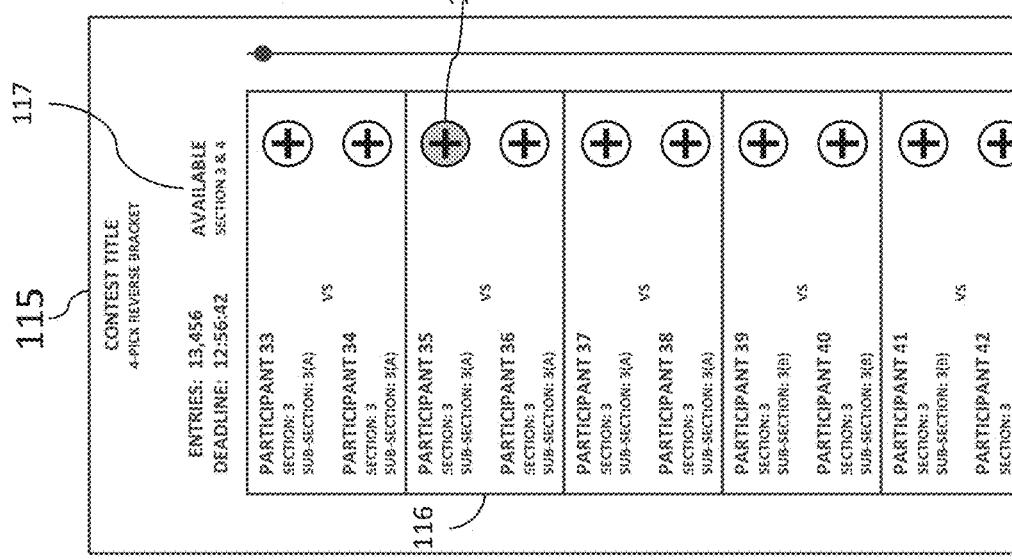
Figure 11A:
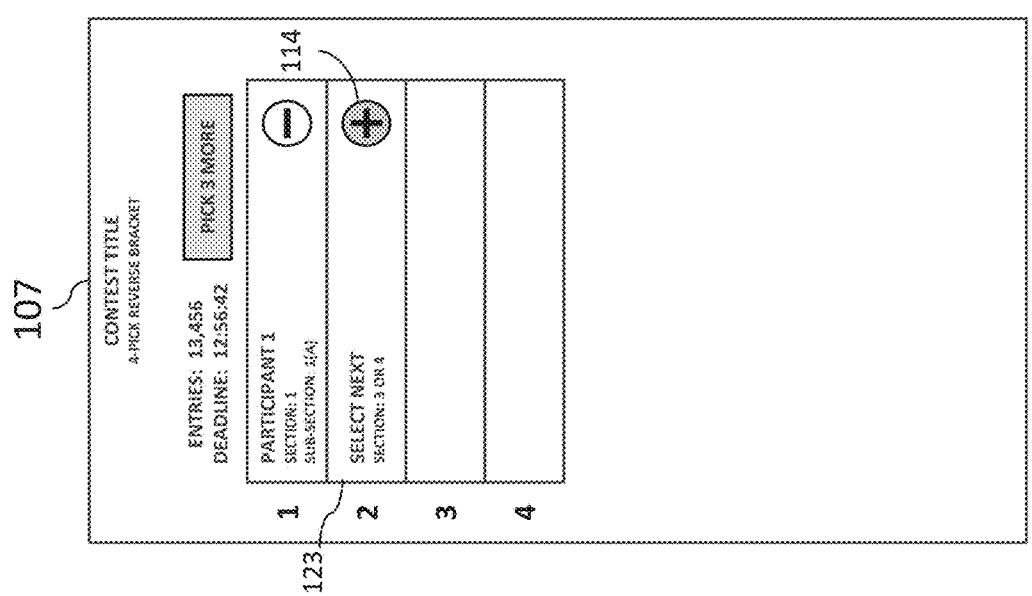

Operating the selection button 114 for the second selection row 123 in the selection window 107 of FIG. 11B brings up the available participant window 115 of FIG. 11B. In the available participant window 115, the available participants 116 are listed and are, for example, grouped based on each participant's slot in the tournament. Note that because the $1^{st}$ place participant selection was made from either section 1 or section 2, the $2^{nd}$ place participant must be selected from section 3 and 4 (the other side of the bracket) as there is no way for the final game of the tournament to be played by two teams from the same side of the bracket.

Figure 12C:
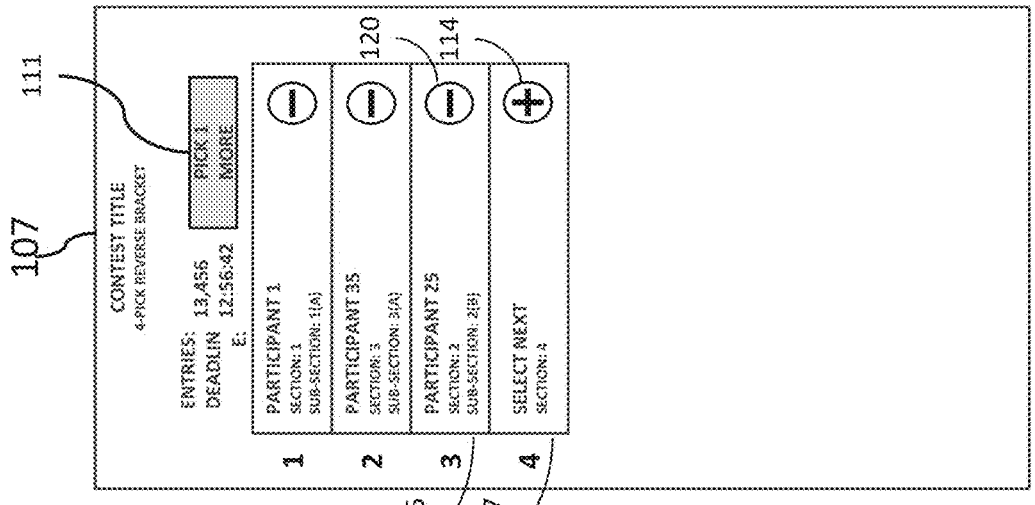
FIGS. 12A, 12B, and 12C illustrate the user-interfaces that enables the entrant to select a third participant of four participants in the tournament in which an objective criterion is used to determine the $3^{rd}$ and $4^{th}$ place participants.
Figure 12B:
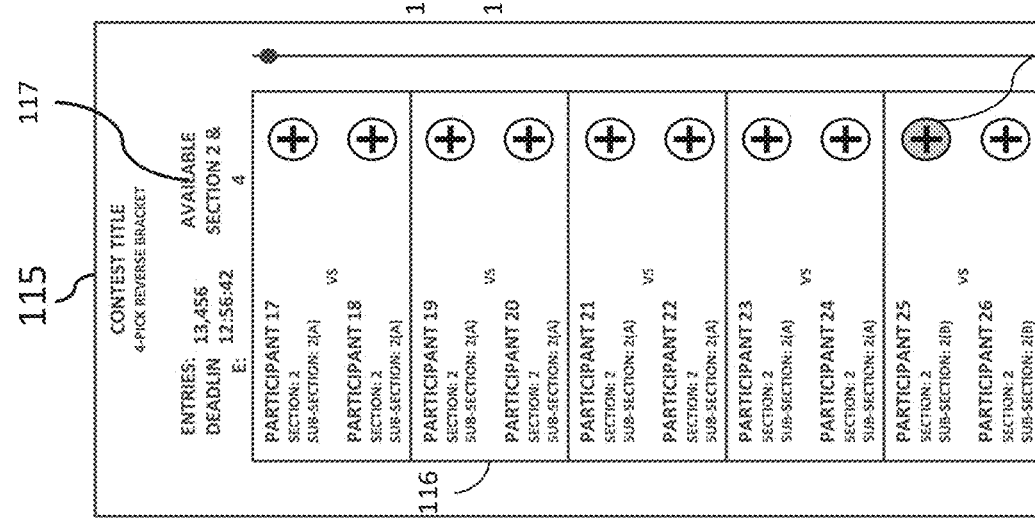
Figure 12A:
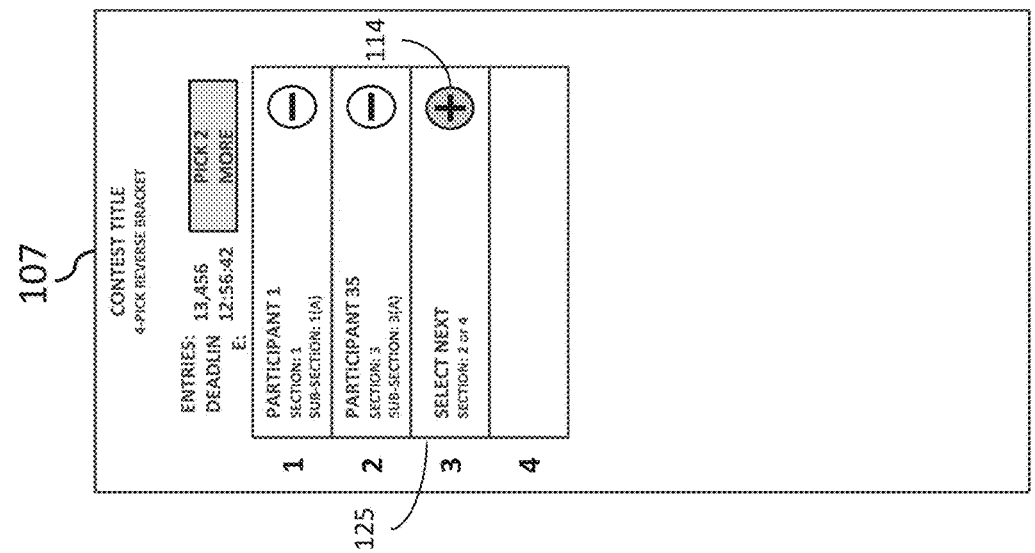

Each of the available participants 116 (e.g., from sections 3 and 4) has an entry confirmation button 118. In FIG. 11C, when the entry confirmation button 118 is depressed, the selected participant is added in the $2^{nd}$ place slot in the second selection row 123 of the selection window 107 and a remove button 120 now appears next to the participant's name to enable the entrant to remove them from the second selection row 123. The confirmation button 111 appears, but remains deactivated until the number of remaining required selections are completed. The third selection row 125 of the selection window 107 is now populated with the selection button 114 and the next selection, the 3rd place selection, is made as shown in FIGS. 12A, 12B, and 12C. Note that the selection of the first participant and second participant is similar to the above tournament as in any scenario, the second participant must come from the opposite side of the bracket as the first participant. Therefore, if instead, the first participant is selected from sections 3 and 4 (instead of 1 and 2), the available participants for the $2^{nd}$ place participants must come from sections 1 and 2.

Figure 13C:
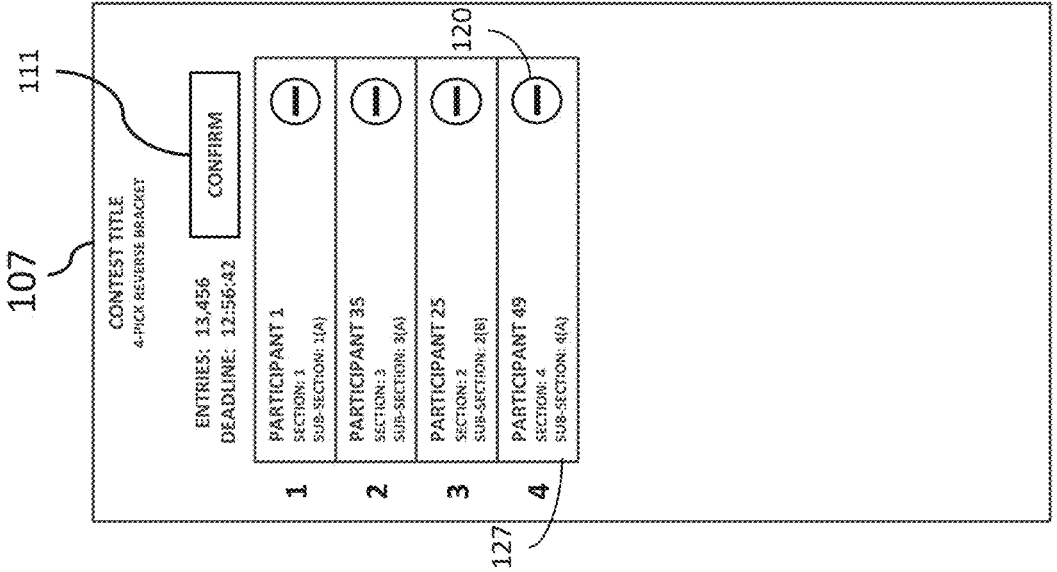
FIGS. 13A, 13B, and 13C illustrate the user-interfaces that enables the entrant to select a fourth participant of four participants in the tournament in which an objective criterion is used to determine the $3^{rd}$ and $4^{th}$ place participants.

Operating the selection button 114 for the third selection row 125 in the selection window 107 of FIG. 12A brings up the available participant window 115 of FIG. 12B. In the available participant window 115, the available participants 116 are listed and are, for example, grouped based on each participant's slot in the tournament. Note that because the $1^{st}$ place participant selection was made from section 1 and the $2^{nd}$ place participant selection was made from section 3, the $3^{rd}$ place participant must be selected from either section 2 or 4 as there is no way for the $1^{st}$ place participant from section 1 to have previously played against another participant in section 1 and there is no way for the $2^{nd}$ place participant from section 3 to have previously played against another participant in section 3. Therefore, each of the available participants 116 (e.g., from sections 2 or 4) has an entry confirmation button 118. When the entry confirmation button 118 is depressed and a participant has been selected, the selection window 107 is again displayed as in FIG. 12C. The confirmation button appears, but remains deactivated until the number of remaining required selections are completed and the selected participant for $3^{rd}$ place from the available participant window 115 appears in the third selection row 125 of the selection window 107 and a remove button 120 now appears next to the participants name to enable the entrant to remove the selected participant from the third selection row 125. The fourth selection row 127 of the selection window 107 is now populated with the selection button 114 and the next selection, the $4^{th}$ place selection, is made as shown in FIGS. 13A, 13B, and 13C.

Figure 13B:
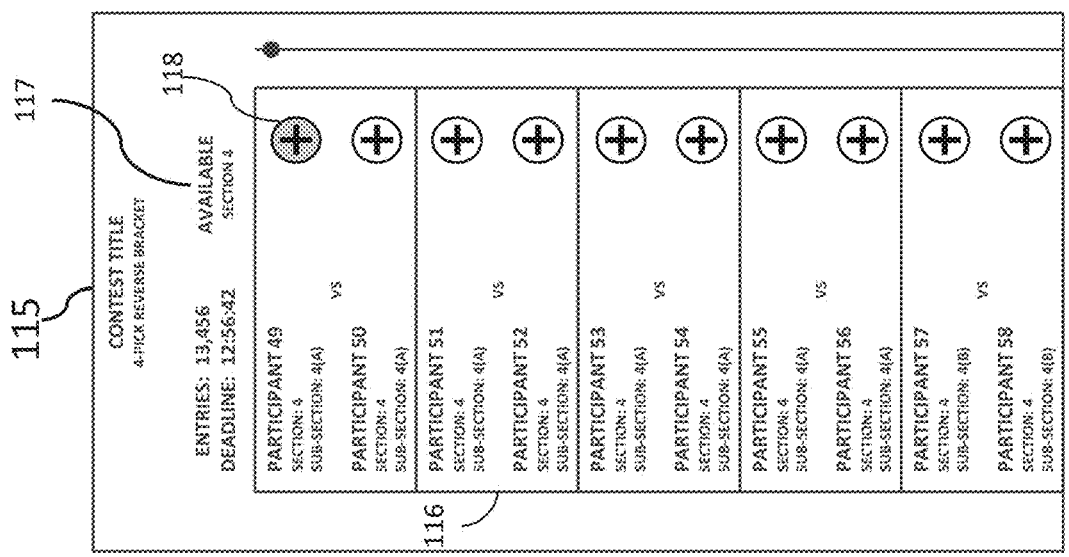
Figure 13A:
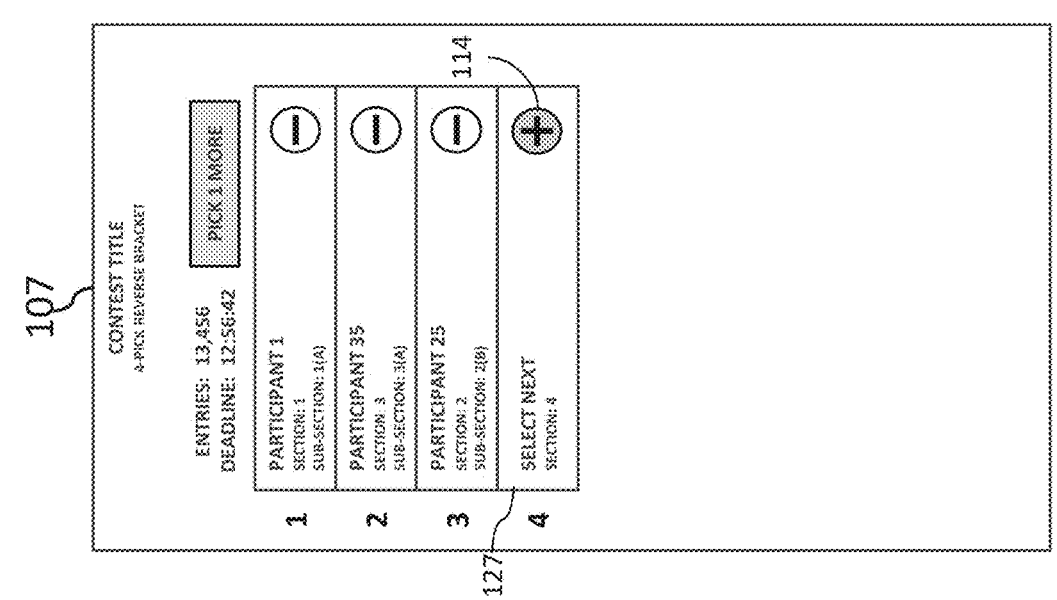

Operating the selection button 114 for the $4^{th}$ place selection in the selection window 107 of FIG. 13B brings up the available participant window 115 of FIG. 13B. In the available participant window 115, the available participants 116 are listed and are, for example, grouped based on each participant's slot in the tournament. Note that because the 1st place participant selection was made from either section 1 and the $2^{nd}$ place participant selection was made from section 3 and the $3^{rd}$ place participant selection was made from section 2, the $4^{th}$ place participant must be selected from section 4 as there is no way for the $1^{st}$ place participant from section 1 to have previously played against another participant in section 1 and there is no way for the $2^{nd}$ place participant from section 3 to have previously played against another participant in section 3 and the $3^{rd}$ place participant selection was made from section 2. Therefore, each of the available participants 116 (e.g., from section 4 only) has an entry confirmation button 118. When the entry confirmation button 118 is depressed, the selection window 107 is again displayed as in FIG. 13C. The confirmation button is now activated allowing the entrant to make changes before confirming (pressing the confirmation button 111), at which time the entrant's selections are made. Also, in FIG. 13C, the participant predicted to come in $4^{th}$ place from the available participant window 115 appears in the fourth selection row 127 of the selection window 107 and a remove button 120 now appears next to the participants name to enable the entrant to remove the selected participant from the fourth selection row 127.

After the tournament completes, the participant that lost in the final round is declared the $2^{nd}$ place participant and the participants that played against the 1st place participant and the second-place participant in the semi-finals are declared as either the $3^{rd}$ place participant or the $4^{th}$ place participant based upon an objective criterion such as point differentials. For example, if the participant that played against the $1^{st}$ place participant lost 35 to 12 (23-point differential) and the participant that played against the $2^{nd}$ place participant lost 50 to 48 (two-point differential), then the participant that played against the $2^{nd}$ place participant is declared the $3^{rd}$ place participant and the participant that played against the $1^{st}$ place participant is declared the $4^{th}$ place participant. To provide even greater granularity as it is anticipated that the point differential of the semi-final matches may be the same (e.g., both the first-place participant and the second-place participant won by 12 points), then prior games are considered either with equal weight (e.g., the point differential in the semi-final game plus the point differential in the prior game played by each participant) or priority weight (e.g., if the point differential of both participants in the semi-final game is equal, then use the prior game point differential of each participant to decide third-place).

Note that after the matches all complete, the tournament is evaluated for winners similar to that shown in FIGS. 8A, 8B, and 8C.

Note that the above examples show tournaments in which four selections (or predictions) are made of the top four participants, though it is fully anticipated that tournaments include more or less selections (or predictions) including odd numbers of selections. For example, in the above scenario, it is anticipated that only the first three participants be selected by the entrant.

What is claimed is:

1. A bracket contest system comprising:
   a server;
   a set of matches between participants in a single elimination bracket tournament stored in a memory accessible by the server, each match being between two of the participants in the single elimination bracket tournament with y-rounds of play in which one half of the participants are eliminated in each round of play;

a bracket contest entrant device connected to the server, the bracket contest entrant device receiving predictions before a start of a first match of the set of matches, each prediction consisting of a pre-set number of predicted winners and/or losers of each match in the set of matches starting with a winner of a final match, the predictions entered sequentially based on a predicted final rank of the participants in order from first place to $n^{th}$ place, where after each selection is made from the bracket contest entrant device, a next selection is limited to participants from a predetermined valid position in the single elimination bracket tournament;

means for receiving results of the set of matches from a data source by the server; and means for determining a score of the predictions based upon the results of the set of matches from the data source and if the score of the predictions exceeds a threshold, declaring the predictions a winning entry.

2. The bracket contest system of claim 1, wherein the set of matches is divided into two mutually exclusive halves with each half producing a single participant to play in the final match.

3. The bracket contest system of claim 2, wherein each half is divided into a first section and a second section that are mutually exclusive, a first section winner playing in a match against a second section winner in a semi-final match for each half.

4. The bracket contest system of claim 3, wherein each first section is divided into a first sub-section and a second sub-section that are mutually exclusive, each winner of the first sub-section playing in the match against a winner of the second sub-section in a quarterfinal match.

5. The bracket contest system of claim 4, wherein the means for determining the score of the predictions based upon the results determines which participant is in first place being the participant that wins the final match and determines which participant is in second place being the participant that loses the final match.

6. The bracket contest system of claim 5, wherein the means for determining the score of the predictions based upon the results determines which participant is in third place being the participant that loses the semi-final match to the participant that is in the first place and the means for determining the score of the predictions based upon the results determines which participant is in fourth place being the participant that loses the semi-final match to the participant that is in the second place.

7. The bracket contest system of claim 5, wherein the means for determining the score of the predictions based upon the results determines which participant is in third place being either the participant that loses the semi-final match to the participant that is in the first place or the participant that loses the semi-final match to the participant that is in the second place based upon an objective criteria and the means for determining the score of the predictions based upon the results determines which participant is in fourth place being either the participant that loses the semi-final match to the participant that is in the first place or the participant that loses the semi-final match to the participant that is in the second place that is not the participant that is in the third place.

8. The bracket contest system of claim 7, wherein the objective criteria comprises a point differential in the match between the participant that loses the semi-final match to the participant that is in the first place and the match between the participant that loses the semi-final match to the participant that is in the second place.

9. The bracket contest system of claim 6, wherein the means for determining the score of the predictions based upon the results determines which participant is in fifth place as being the participant that loses a first quarter-final match to the participant that is in the first place and the means for determining the score of the predictions based upon the results determines which participant is in sixth place as being the participant that loses a second quarter-final match to the participant that is in the second place.

10. The bracket contest system of claim 9, wherein the means for determining the score of the predictions based upon the results determines which participant is in seventh place as being the participant that loses a third quarter-final match to the participant that is in the third place and the means for determining the score of the predictions based upon the results determines which participant is in eighth place as being the participant that loses a fourth quarter-final match to the participant that is in the fourth place.

11. The bracket contest system of claim 1, wherein the participants comprise athletes or teams.

12. The bracket contest system of claim 1, wherein the participants are selected from a group consisting of NCAA men's basketball teams, NCAA women's basketball teams, professional tennis players, amateur tennis players, FIFA World Cup teams, Olympics athletes, Olympics teams, Cricket World Cup teams, Rugby Union World Cup teams, and eSports teams.

13. The bracket contest system of claim 1, wherein the participants include a set of items that are measured over a period of time selected from a group consisting of securities, cryptocurrencies, songs, videos, and pictures, and the means for determining the results includes measuring a performance of each item based on objective performance criteria.

14. The bracket contest system of claim 1, wherein the set of matches comprise competitions chosen from a group consisting of video games, chess competitions, beauty contests, music contests, and talent contests, and the means for determining the results includes measuring a performance of each of the participants based on objective performance criteria comprising a vote of judges or audience votes.

15. A method of scoring a bracket contest comprising:

creating a set of predetermined valid matches in a single elimination bracket tournament, the single elimination bracket tournament comprising a structured set of matches between participants in the single elimination bracket tournament;

before a start of a first match of the set of predetermined valid matches, selecting predictions consisting of a pre-set number of predicted participants that are predicted to be winners and/or losers of matches starting with a final match, the selecting predictions being performed in order from a first-place participant to an $n^{th}$ place participant, where each successive prediction is limited to participants from a predetermined valid position in the single elimination bracket tournament;

after selecting the predictions, receiving results of the set of predetermined valid matches from a data source; and generating a score of the predictions based upon the results of the set of predetermined valid matches from a data source and declaring the predictions as a winning prediction when the score of the predictions exceeds a threshold.

16. A bracket contest system comprising:
a server;
a set of matches for a single elimination basketball bracket tournament stored in a memory accessible by the server, each match of the set of matches being between two basketball teams of 64 basketball teams in the single elimination basketball bracket tournament with six rounds of play in which one half of the basketball teams is eliminated in each round of play;
a bracket contest entrant device connected to the server, the bracket contest entrant device receiving predictions before a start of a first match of the set of matches, each prediction consisting of a pre-set number of predicted winners and/or losers of each match in the set of matches starting with a winner of a final match, the predictions entered sequentially based on a predicted final rank of a selected basketball team in order from first place to $n^{th}$ place, where each subsequent selection is limited to participants from a predetermined valid position in the single elimination basketball bracket tournament;
means for receiving results of the set of matches from a data source by the server; and
means for determining a score of the predictions based upon the results of the set of matches from a data source and if the score of the predictions exceeds a threshold, declaring the predictions as a winning entry.

17. The bracket contest system of claim 16, wherein the set of matches is divided into two mutually exclusive halves with each half producing a single participant to play in the final match; each half is divided into a first section and a second section that are mutually exclusive, a winner of the first section playing in a match against the winner of the second section a semi-final match for each half; each first section is divided into a first sub-section and a second sub-section that are mutually exclusive, each of the winners of the first sub-section playing in the match against the winner of the second sub-section in a quarterfinal match.

18. The bracket contest system of claim 17, wherein the means for determining the score of the predictions of the entrant based upon the results determines which participant is in first place being the participant that wins the final match and determines which participant is in second place being the participant that loses the final match; and the means for determining the score of the predictions of the entrant based upon the results determines which participant is in third place being the participant that loses the semi-final match to the participant that is in the first place and the means for determining the score of the predictions of the entrant based upon the results determines which participant is in fourth place being the participant that loses the semi-final match to the participant that is in the second place.

19. The bracket contest system of claim 17, wherein the means for determining the score of the predictions of the entrant based upon the results determines which participant is in first place being the participant that wins the final match and determines which participant is in second place being the participant that loses the final match; the means for determining the score of the predictions of the entrant based upon the results determines which participant is in third place being either the participant that loses the semi-final match to the participant that is in the first place or the participant that loses the semi-final match to the participant that is in the second place based upon an objective criteria; and the means for determining the score of the predictions of the entrant based upon the results determines which participant is in fourth place being either the participant that loses the semi-final match to the participant that is in the first place or the participant that loses the semi-final match to the participant that is in the second place that is not the participant that is in the third place.

20. The bracket contest system of claim 19, wherein the objective criteria comprise a point differential in the match between the participant that loses the semi-final match to the participant that is in the first place and the match between the participant that loses the semi-final match to the participant that is in the second place.

\* \* \* \* \*